US011942704B2

(12) United States Patent
Yun et al.

(10) Patent No.: US 11,942,704 B2
(45) Date of Patent: Mar. 26, 2024

(54) ANTENNA AND ELECTRONIC DEVICE INCLUDING THE SAME

(71) Applicant: Samsung Electronics Co., Ltd., Suwon-si (KR)

(72) Inventors: Sumin Yun, Suwon-si (KR); Hosaeng Kim, Suwon-si (KR); Seongjin Park, Suwon-si (KR); Woomin Jang, Suwon-si (KR); Jehun Jong, Suwon-si (KR); Jaehoon Jo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 234 days.

(21) Appl. No.: 17/584,981

(22) Filed: Jan. 26, 2022

(65) Prior Publication Data

US 2022/0231420 A1 Jul. 21, 2022

Related U.S. Application Data

(63) Continuation of application No. PCT/KR2022/000638, filed on Jan. 13, 2022.

(30) Foreign Application Priority Data

Jan. 20, 2021 (KR) ........................ 10-2021-0007832

(51) Int. Cl.

| | |
|---|---|
| ***H01Q 1/24*** | (2006.01) |
| ***H01Q 1/44*** | (2006.01) |
| ***H01Q 9/04*** | (2006.01) |

(52) U.S. Cl.

CPC ............. *H01Q 9/0421* (2013.01); *H01Q 1/44* (2013.01); *H01Q 1/243* (2013.01)

(58) Field of Classification Search

CPC ........ H01Q 9/0421; H01Q 1/528; H01Q 1/44; H01Q 1/243

(Continued)

(56) References Cited

U.S. PATENT DOCUMENTS

2010/0331050 A1 12/2010 Tahk et al.
2019/0165472 A1 5/2019 Yun et al.
(Continued)

FOREIGN PATENT DOCUMENTS

CN 109346829 B 10/2020
JP 6439481 B2 12/2018
(Continued)

OTHER PUBLICATIONS

International Search Report dated Apr. 26, 2022, issued in International Application No. PCT/KR2022/000638.
(Continued)

*Primary Examiner* — Peguy Jean Pierre
(74) *Attorney, Agent, or Firm* — Jefferson IP Law, LLP

(57) ABSTRACT

An electronic device is provided that includes a housing, an antenna structure, an electronic component, and a wireless communication circuit. The antenna structure includes a substrate, at least one conductive patch disposed at the substrate, at least one power feeder disposed at a position of the at least one conductive patch, and at least one electrical connection structure. The at least one electrical connection structure includes a first conductive via disposed to pass through the at least one conductive patch and a ground layer of the substrate, and a second conductive via passing through the at least one conductive patch and electrically connected to the ground layer. The electronic component is disposed to overlap at least in part with the at least one conductive patch when the substrate is viewed from above, and is electrically connected to a main board through the at least one electrical connection structure. The wireless communication circuit is electrically connected to the at least one power feeder, and is configured to form a beam pattern in a first direction through the at least one conductive patch.

20 Claims, 36 Drawing Sheets

(58) Field of Classification Search
USPC .......................................... 343/720, 700 MS
See application file for complete search history.

(56) References Cited

U.S. PATENT DOCUMENTS

| | | | | |
|---|---|---|---|---|
| 2020/0021019 | A1 | 1/2020 | Rajagopalan et al. | |
| 2020/0194879 | A1 | 6/2020 | Lim et al. | |
| 2020/0212584 | A1 | 7/2020 | Park et al. | |
| 2020/0227821 | A1* | 7/2020 | Wu | H01Q 1/38 |
| 2020/0266521 | A1 | 8/2020 | Jeong et al. | |
| 2020/0373647 | A1* | 11/2020 | Lee | H01Q 1/243 |
| 2021/0218143 | A1 | 7/2021 | Huang et al. | |
| 2022/0069443 | A1 | 3/2022 | Jeon et al. | |

FOREIGN PATENT DOCUMENTS

| | | | |
|---|---|---|---|
| KR | 10-1242389 | B1 | 3/2013 |
| KR | 10-1282878 | B1 | 7/2013 |
| KR | 10-1552155 | B1 | 9/2015 |
| KR | 10-1803204 | B1 | 11/2017 |
| KR | 10-2019-0062064 | A | 6/2019 |
| KR | 10-2020-0073745 | A | 6/2020 |
| KR | 10-2020-0081760 | A | 7/2020 |
| KR | 10-2020-0092719 | A | 8/2020 |
| KR | 10-2020-0099813 | A | 8/2020 |
| WO | 2020/141863 | A1 | 7/2020 |
| WO | 2022/158789 | A1 | 7/2022 |

OTHER PUBLICATIONS

Written Opinion dated Apr. 26, 2022, issued in International Application No. PCT/KR2022/000638.

Notification of Publication dated Jul. 28, 2022, issued in International Application No. PCT/KR2022/000638.

* cited by examiner

ANTENNA AND ELECTRONIC DEVICE INCLUDING THE SAME

CROSS-REFERENCE TO RELATED APPLICATION(S)

This application is a continuation application, claiming priority under § 365(c), of an International application No. PCT/KR2022/000638, filed on Jan. 13, 2022, which was based on and claimed the benefit of a Korean patent application number 10-2021-0007832, filed on Jan. 20, 2021, in the Korean Intellectual Property Office, the disclosure of which is incorporated by reference herein in its entirety.

TECHNICAL FIELD

The disclosure relates to an antenna and an electronic device including the same.

BACKGROUND ART

With the development of wireless communication technology, electronic devices (e.g., an electronic device for communication) are widely used in everyday life, and thus the use of contents is increasing exponentially. Due to the rapid increase in the use of contents, the network capacity is gradually reaching the limit, and after the commercialization of 4th-generation (4G) communication systems, next-generation communication systems (e.g., a 5th-generation (5G) communication system, a pre-5G communication system, or a new radio (NR) communication system) using a super-high frequency (e.g., mmWave) band (e.g., 3 GHz to 300 GHz band) is now studied in order to satisfy the increasing demands of radio data traffic.

The above information is presented as background information only to assist with an understanding of the disclosure. No determination has been made, and no assertion is made, as to whether any of the above might be applicable as prior art with regard to the disclosure.

DISCLOSURE

Technical Problem

Next-generation wireless communication technologies are currently developed to permit signal transmission/reception using frequencies in the range of 3 GHz to 100 GHz, address a high free space loss due to frequency characteristics, implement an efficient mounting structure for increasing an antenna gain, and realize a related new antenna module (e.g., an antenna structure). The antenna module may include an antenna module of an array form in which various numbers of antenna elements (e.g., conductive patches) are disposed at regular intervals. These antenna elements may be disposed to form a beam pattern in any one direction inside the electronic device. For example, the antenna module may be disposed such that a beam pattern is formed toward at least a portion of at least one of the front surface, the rear surface, or the side surface in the inner space of the electronic device.

Meanwhile, various electronic components (e.g., a key button device and/or at least one sensor module) as well as the antenna module may be disposed in the electronic device, and such electronic components may have an appropriate arrangement structure to perform their functions without impairing the radiation performance of the antenna module.

However, in the electronic device that is gradually becoming slimmer, an arrangement space that allows the antenna module to be disposed in the inner space of the electronic device without deterioration of radiation performance due to interference of other electronic components is gradually reduced. Thus, the electronic device requires an efficient antenna arrangement structure with other electronic components without deterioration of radiation performance.

Aspects of the disclosure are to address at least the above-mentioned problems and/or disadvantages and to provide at least the advantages described below. Accordingly, an aspect of the disclosure is to provide an antenna having an efficient arrangement structure with other electronic components and an electronic device including the same.

Another aspect of the disclosure is to provide an antenna disposed together with other electronic components without deterioration in radiation performance and thereby helping to slim an electronic device, and an electronic device including the same.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing; an antenna structure disposed in an inner space of the housing and including a substrate having a first substrate surface facing toward a first direction, a second substrate surface facing toward a direction opposite to the first substrate surface, and a ground layer disposed in a space between the first substrate surface and the second substrate surface, at least one conductive patch disposed between the ground layer and the first substrate surface or to be exposed to the first substrate surface, at least one power feeder disposed at a position of the at least one conductive patch, and at least one electrical connection structure disposed at the substrate including: a first conductive via disposed to pass through the at least one conductive patch and the ground layer, and a second conductive via passing through the at least one conductive patch and electrically connected to the ground layer; an electronic component disposed on the first substrate surface and disposed to overlap at least in part with the at least one conductive patch when the first substrate surface is viewed from above, the electronic component being electrically connected to a main board through the at least one electrical connection structure; and a wireless communication circuit disposed in the inner space, electrically connected to the at least one power feeder, and configured to form a beam pattern in the first direction through the at least one conductive patch.

Advantageous Effects

The antenna according to an embodiment of the disclosure can help to utilize an arrangement space because at least one electronic component (e.g., a key button device) is disposed together through at least a portion of an antenna structure without degradation of radiation performance.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
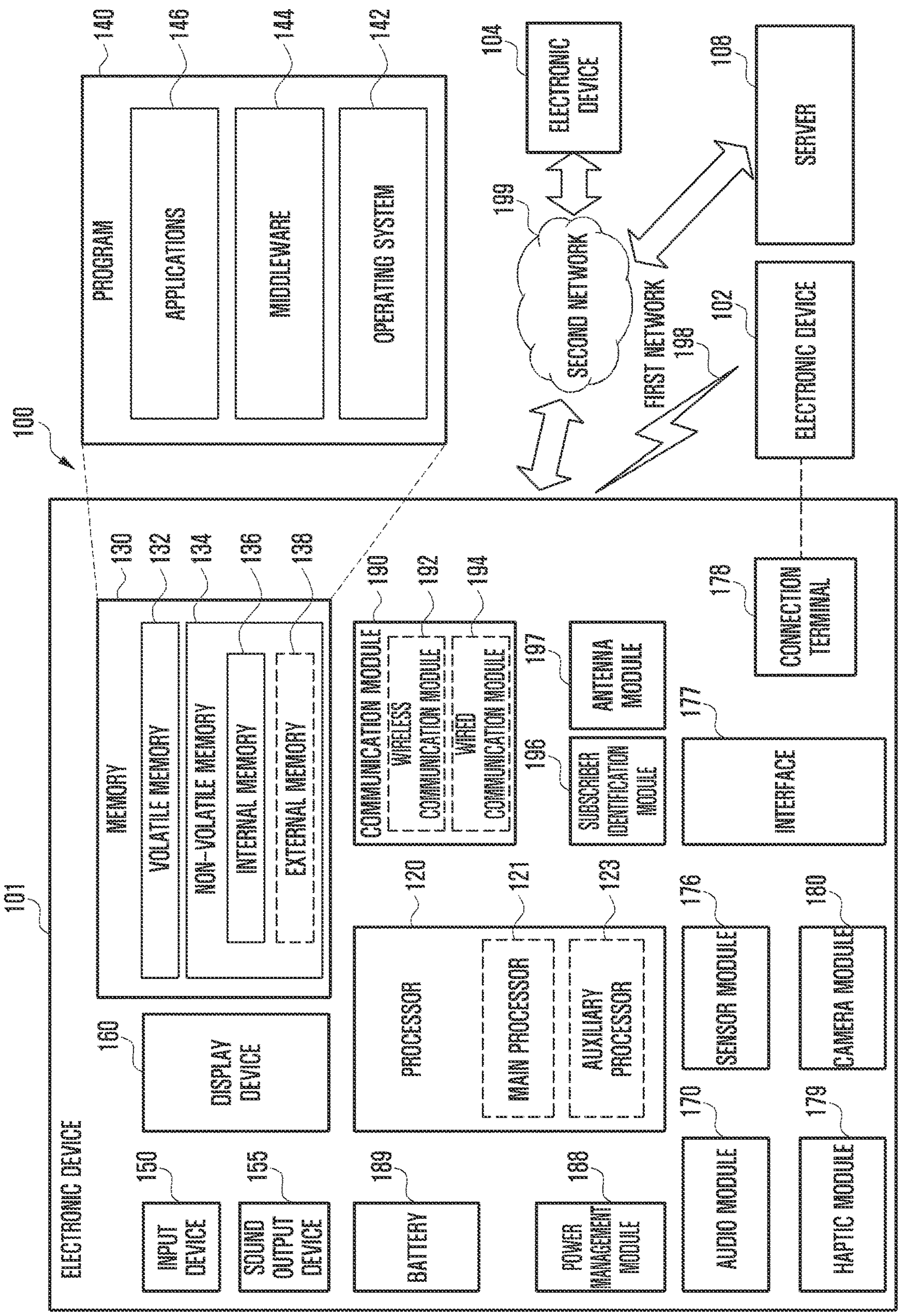
FIG. 1 is a block diagram illustrating an electronic device in a network environment according to an embodiment of the disclosure.

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an sound output module 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for an incoming call. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
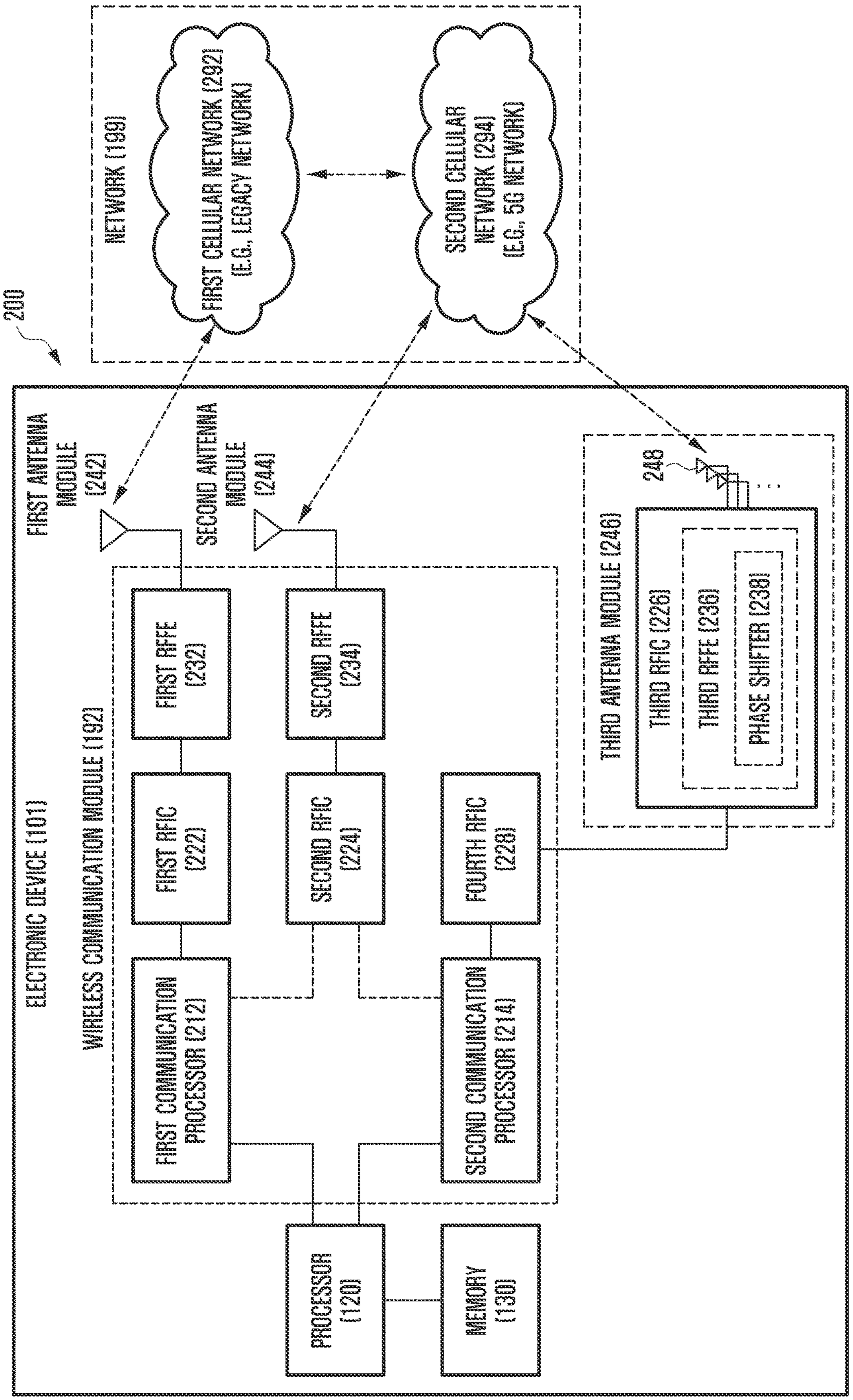
FIG. 2 is a block diagram illustrating an electronic device for supporting a legacy network communication and a 5th generation (5G) network communication according to an embodiment of the disclosure.

FIG. 2 is a block diagram illustrating an electronic device in a network environment 200 including a plurality of cellular networks according to an embodiment of the disclosure.

Referring to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), 3rd generation (3G), 4G, or long term evolution (LTE) network. The second communication processor 214 may establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above6RF signal. Upon reception, the 5G Above6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60

GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
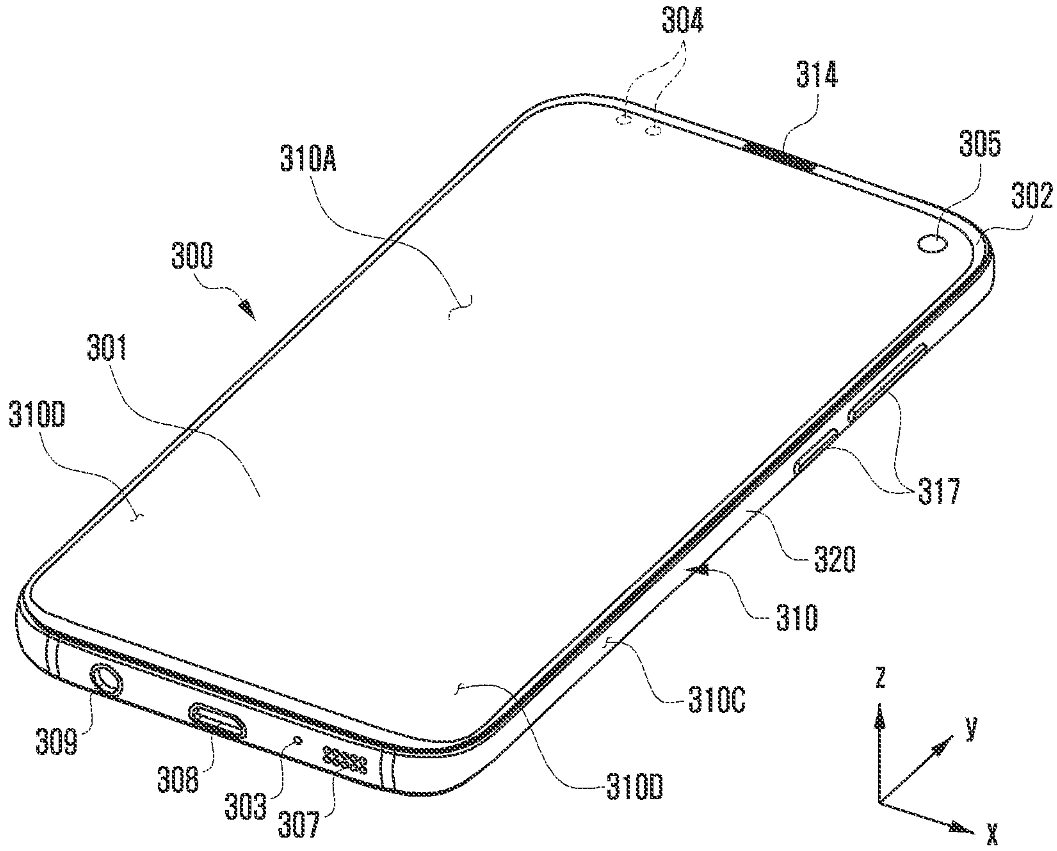
FIG. 3A is a perspective view illustrating a mobile electronic device according to an embodiment of the disclosure.
Figure 3B:
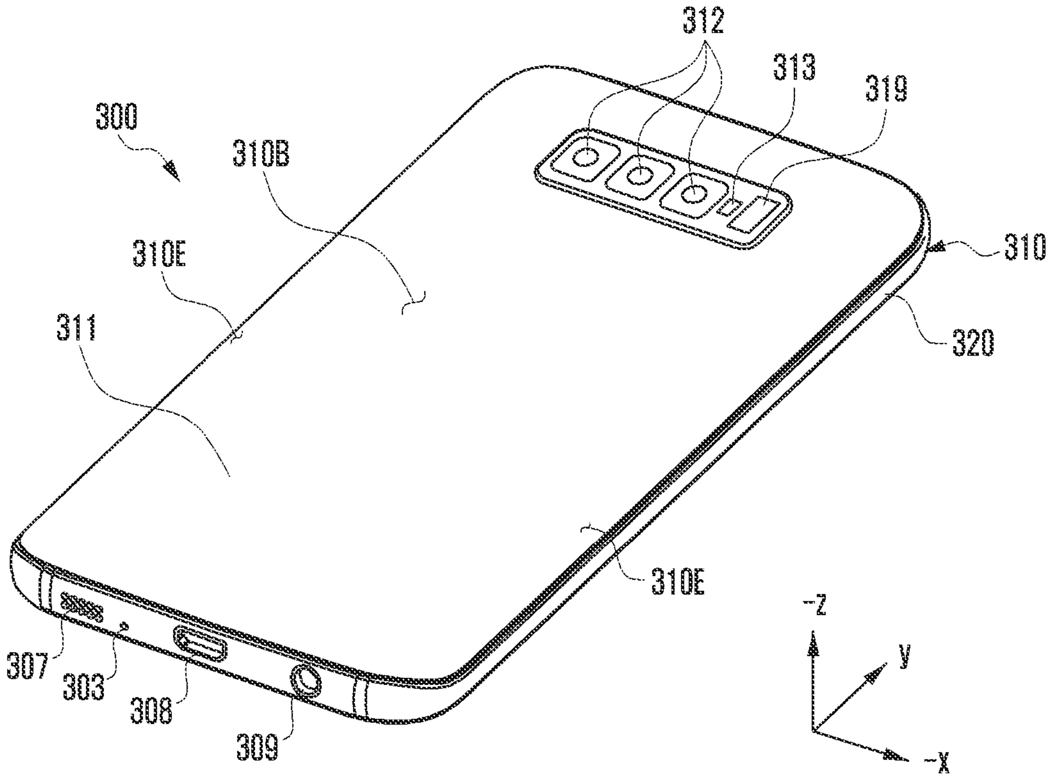
FIG. 3B is a rear perspective view illustrating the mobile electronic device according to an embodiment of the disclosure.

FIG. 3A illustrates a perspective view showing a front surface of a mobile electronic device according to an embodiment of the disclosure, and FIG. 3B illustrates a perspective view showing a rear surface of the mobile electronic device shown in FIG. 3A according to an embodiment of the disclosure.

The electronic device 300 in FIGS. 3A and 3B may be at least partially similar to the electronic device 101 in FIG. 1 or may further include other embodiments.

Referring to FIGS. 3A and 3B, a mobile electronic device 300 may include a housing 310 that includes a first surface (or front surface) 310A, a second surface (or rear surface) 310B, and a lateral surface 310C that surrounds a space between the first surface 310A and the second surface 310B. The housing 310 may refer to a structure that forms a part of the first surface 310A, the second surface 310B, and the lateral surface 310C. The first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") 318 which is combined with the front plate 302 and the rear plate 311 and includes a metal and/or polymer. The rear plate 311 and the lateral bezel structure 318 may be integrally formed and may be of the same material (e.g., a metallic material such as aluminum).

The front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. The front plate 302 (or the rear plate 311) may include only one of the first regions 310D (or of the second regions 310E). The first regions 310D or the second regions 310E may be omitted in part. When viewed from a lateral side of the mobile electronic device 300, the lateral bezel structure 318 may have a first thickness (or width) on a lateral side where the first region 310D or the second region 310E is not included, and may have a second thickness, being less than the first thickness, on another lateral side where the first region 310D or the second region 310E is included.

The mobile electronic device 300 may include at least one of a display 301, audio modules 303, 307 and 314, sensor modules 304 and 319, camera modules 305, 312 and 313, a key input device 317, a light emitting device, and connector holes 308 and 309. The mobile electronic device 300 may omit at least one (e.g., the key input device 317 or the light emitting device) of the above components, or may further include other components.

The display 301 may be exposed through a substantial portion of the front plate 302, for example. At least a part of the display 301 may be exposed through the front plate 302 that forms the first surface 310A and the first region 310D of the lateral surface 310C. Outlines (i.e., edges and corners) of the display 301 may have substantially the same form as those of the front plate 302. The spacing between the outline of the display 301 and the outline of the front plate 302 may be substantially unchanged in order to enlarge the exposed area of the display 301. A recess or opening may be formed in a portion of a display area of the display 301 to accommodate at least one of the audio module 314, the sensor module 304, the camera module 305, and the light emitting device. At least one of the audio module 314, the sensor module 304, the camera module 305, a fingerprint sensor (not shown), and the light emitting element may be disposed on the back of the display area of the display 301. The display 301 may be combined with, or adjacent to, a touch sensing circuit, a pressure sensor capable of measuring the touch strength (pressure), and/or a digitizer for detecting a stylus pen. At least a part of the sensor modules 304 and 319 and/or at least a part of the key input device 317 may be disposed in the first region 310D and/or the second region 310E.

The input module 303 may include microphone 303. The microphone hole 303 may contain a microphone disposed therein for acquiring external sounds and, in a case, contain a plurality of microphones to sense a sound direction. The speaker holes 307 and 314 may be classified into an external speaker hole 307 and a call speaker hole 314. The microphone hole 303 and the speaker holes 307 and 314 may be implemented as a single hole, or a speaker (e.g., a piezo speaker) may be provided without the speaker holes 307 and 314.

The sensor modules 304 and 319 may generate electrical signals or data corresponding to an internal operating state of the mobile electronic device 300 or to an external environmental condition. The sensor modules 304 and 319 may include a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) and/or a fourth sensor module (e.g., a fingerprint sensor) disposed on the second surface 310B of the housing 310. The fingerprint sensor may be disposed on the second surface 310B as well as the first surface 310A (e.g., the display 301) of the housing 310. The electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312 and 313 may include a first camera device 305 disposed on the first surface 310A of the electronic device 300, and a second camera module 312 and/or a flash 313 disposed on the second surface 310B. The camera module 305 or the camera module 312 may include one or more lenses, an image sensor, and/or an image signal processor. The flash 313 may include, for example, a light emitting diode or a xenon lamp. Two or more lenses (infrared cameras, wide angle and telephoto lenses) and image sensors may be disposed on one side of the electronic device 300.

The key input device 317 may be disposed on the lateral surface 310C of the housing 310. The mobile electronic device 300 may not include some or all of the key input device 317 described above, and the key input device 317 which is not included may be implemented in another form such as a soft key on the display 301. The key input device 317 may include the sensor module disposed on the second surface 310B of the housing 310.

The light emitting device may be disposed on the first surface 310A of the housing 310. For example, the light emitting device may provide status information of the electronic device 300 in an optical form. The light emitting device may provide a light source associated with the operation of the camera module 305. The light emitting device may include, for example, a light emitting diode (LED), an IR LED, or a xenon lamp.

The connector holes 308 and 309 may include a first connector hole 308 adapted for a connector (e.g., a universal serial bus (USB) connector) for transmitting and receiving power and/or data to and from an external electronic device, and/or a second connector hole 309 adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. In another embodiment, some sensor modules 304 may be arranged to perform their functions without being visually exposed through the front plate 302 in the internal space of the electronic device. For example, in this case, an area of the display 301 facing the sensor module may not require a perforated opening.

Figure 3C:
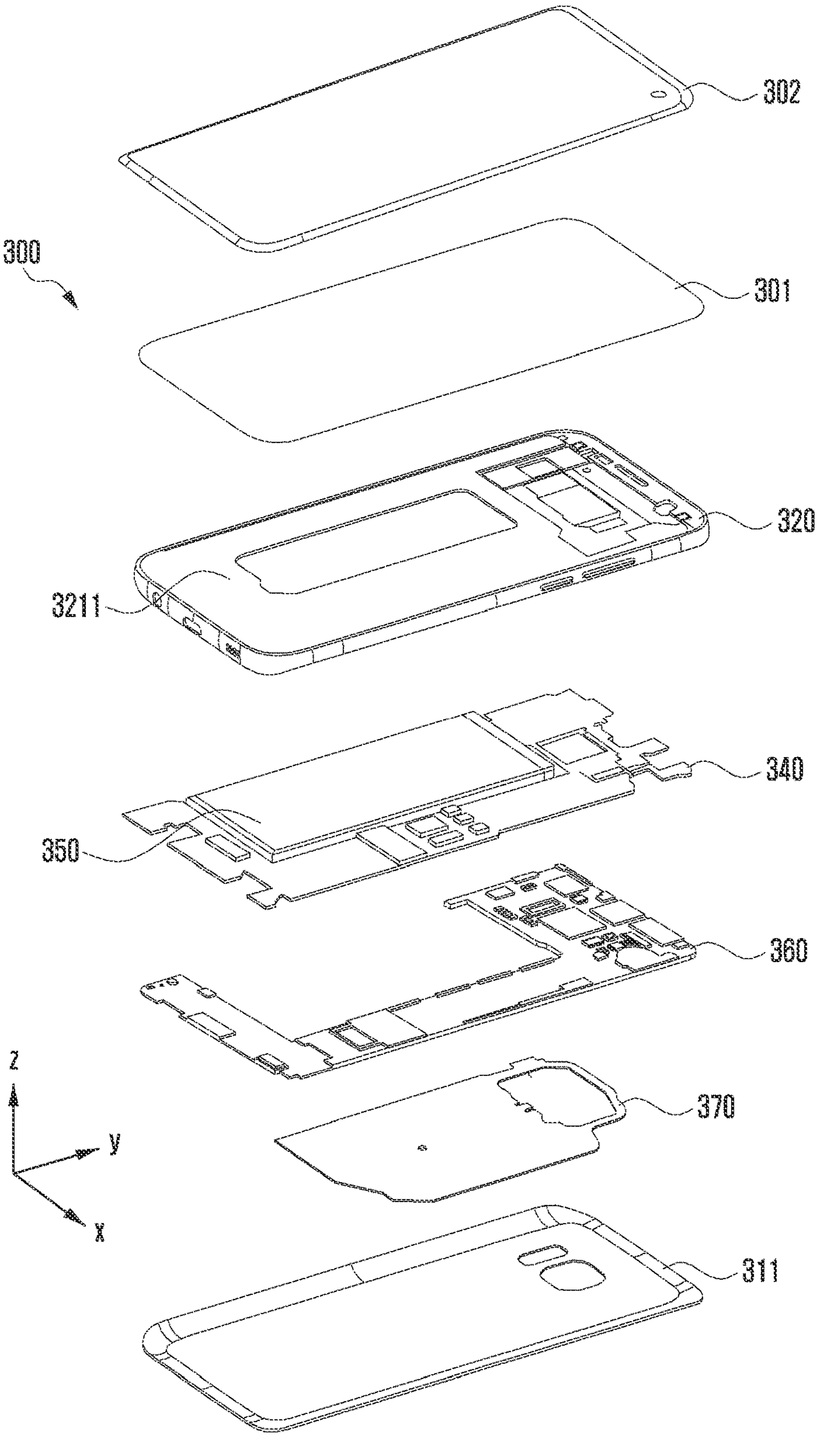
FIG. 3C is an exploded perspective view illustrating the mobile electronic device according to an embodiment of the disclosure.

FIG. 3C illustrates an exploded perspective view showing a mobile electronic device shown in FIG. 3A according to an embodiment of the disclosure.

Referring to FIG. 3C a mobile electronic device 300 may include a lateral bezel structure 320, a first support member 3211 (e.g., a bracket), a front plate 302, a display 301, an electromagnetic induction panel (not shown), a printed circuit board (PCB) 340, a battery 350, a second support member 360 (e.g., a rear case), an antenna 370, and a rear plate 311. The mobile electronic device 300 may omit at least one (e.g., the first support member 3211 or the second support member 360) of the above components or may further include another component. Some components of the electronic device 300 may be the same as or similar to those of the mobile electronic device 101 shown in FIG. 1 or FIG. 2, thus, descriptions thereof are omitted below.

The first support member 3211 is disposed inside the mobile electronic device 300 and may be connected to, or integrated with, the lateral bezel structure 320. The first support member 3211 may be formed of, for example, a metallic material and/or a non-metal (e.g., polymer) material. The first support member 3211 may be combined with the display 301 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 311 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 320 and/or the first support member 3111.

Figure 4A:
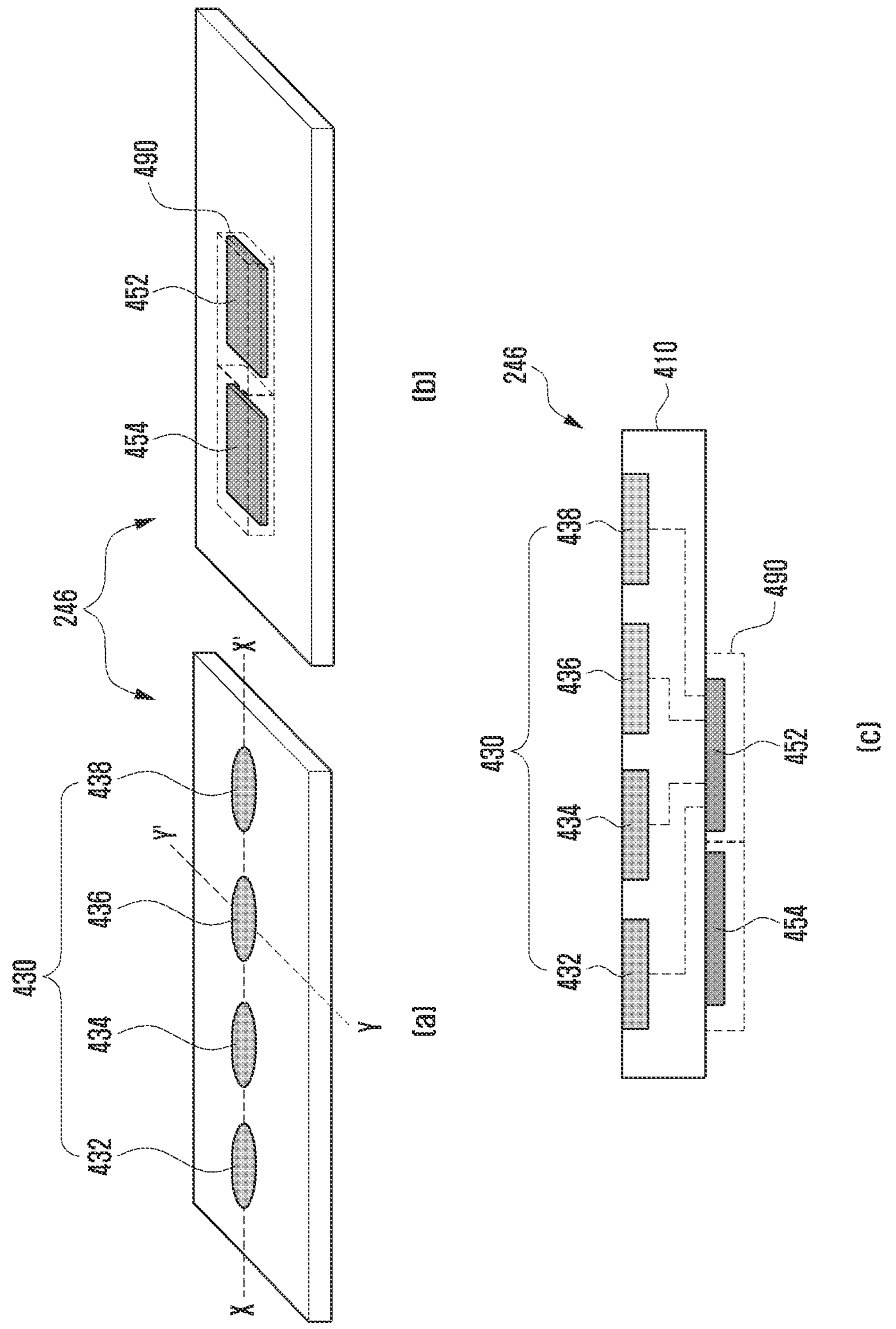
FIG. 4A is a diagram illustrating a structure of the third antenna module shown in and described with reference to FIG. 2 according to an embodiment of the disclosure.

FIG. 4A is a diagram illustrating a structure of, for example, a third antenna module described with reference to FIG. 2 according to an embodiment of the disclosure.

Referring to part (a) of FIG. 4A is a perspective view illustrating the third antenna module 246 viewed from one side, and part (b) of FIG. 4A is a perspective view illustrating the third antenna module 246 viewed from the other side. Part (c) of FIG. 4A is a cross-sectional view illustrating the third antenna module 246 taken along line X-X' of FIG. 4A.

Referring to FIG. 4A, in one embodiment, the third antenna module 246 may include a printed circuit board 410, an antenna array 430, a RFIC 452, and a PMIC 454. Alternatively, the third antenna module 246 may further include a shield member 490. In other embodiments, at least one of the above-described components may be omitted or at least two of the components may be integrally formed.

The printed circuit board 410 may include a plurality of conductive layers and a plurality of non-conductive layers stacked alternately with the conductive layers. The printed circuit board 410 may provide electrical connections between the printed circuit board 410 and/or various electronic components disposed outside using wirings and conductive vias formed in the conductive layer.

The antenna array 430 (e.g., 248 of FIG. 2) may include a plurality of antenna elements 432, 434, 436, or 438 disposed to form a directional beam. As illustrated, the antenna elements 432, 434, 436, or 438 may be formed at a first surface of the printed circuit board 410. According to another embodiment, the antenna array 430 may be formed inside the printed circuit board 410. According to the embodiment, the antenna array 430 may include the same or a different shape or kind of a plurality of antenna arrays (e.g., dipole antenna array and/or patch antenna array).

The RFIC 452 (e.g., the third RFIC 226 of FIG. 2) may be disposed at another area (e.g., a second surface opposite to the first surface) of the printed circuit board 410 spaced apart from the antenna array. The RFIC 452 is configured to process signals of a selected frequency band transmitted/received through the antenna array 430. According to one embodiment, upon transmission, the RFIC 452 may convert a baseband signal obtained from a communication processor (not shown) to an RF signal of a designated band. Upon reception, the RFIC 452 may convert an RF signal received through the antenna array 430 to a baseband signal and transfer the baseband signal to the communication processor.

According to another embodiment, upon transmission, the RFIC 452 may up-convert an IF signal (e.g., about 9 GHz to about 11 GHz) obtained from an intermediate frequency integrate circuit (IFIC) (e.g., 228 of FIG. 2) to an RF signal of a selected band. Upon reception, the RFIC 452 may down-convert the RF signal obtained through the antenna array 430, convert the RF signal to an IF signal, and transfer the IF signal to the IFIC.

The PMIC 454 may be disposed in another partial area (e.g., the second surface) of the printed circuit board 410 spaced apart from the antenna array 430. The PMIC 454 may receive a voltage from a main PCB (not illustrated) to provide power necessary for various components (e.g., the RFIC 452) on the antenna module.

The shielding member 490 may be disposed at a portion (e.g., the second surface) of the printed circuit board 410 so as to electromagnetically shield at least one of the RFIC 452 or the PMIC 454. According to one embodiment, the shield member 490 may include a shield can.

Although not shown, in various embodiments, the third antenna module 246 may be electrically connected to another printed circuit board (e.g., main circuit board) through a module interface. The module interface may include a connecting member, for example, a coaxial cable connector, board to board connector, interposer, or flexible printed circuit board (FPCB). The RFIC 452 and/or the PMIC 454 of the antenna module may be electrically connected to the printed circuit board through the connection member.

Figure 4B:
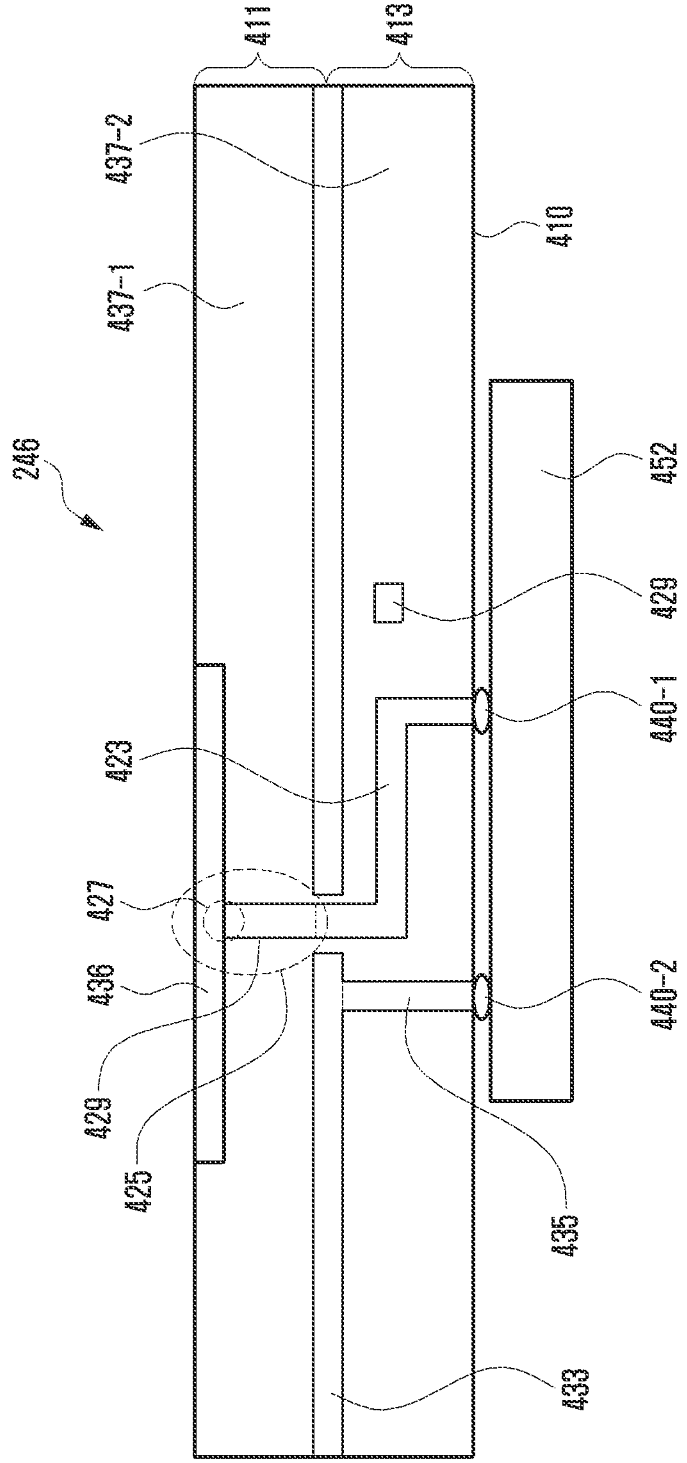
FIG. 4B is a cross-sectional view taken along line Y-Y' of the third antenna module shown in FIG. 4A according to an embodiment of the disclosure.

FIG. 4B is a cross-sectional view illustrating the third antenna module 246 taken along line Y-Y' of part (a) of FIG. 4A according to an embodiment of the disclosure. The printed circuit board 410 of the illustrated embodiment may include an antenna layer 411 and a network layer 413.

Referring to FIG. 4B, the antenna layer 411 may include at least one dielectric layer 437-1, and an antenna element 436 and/or a power feeding portion 425 formed on or inside an outer surface of a dielectric layer. The power feeding portion 425 may include a power feeding point 427 and/or a power feeding line 429.

The network layer 413 may include at least one dielectric layer 437-2, at least one ground layer 433, at least one conductive via 435, a transmission line 423, and/or a power feeding line 429 formed on or inside an outer surface of the dielectric layer.

Further, in the illustrated embodiment, the RFIC 452 (e.g., the third RFIC 226 of FIG. 2) of part (c) of FIG. 4A may be electrically connected to the network layer 413 through, for example, first and second solder bumps 440-1 and 440-2. In other embodiments, various connection structures (e.g., solder or ball grid array (BGA)) instead of the solder bumps may be used. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. Although not illustrated, the RFIC 452 may also be electrically connected to the above-described module interface through the power feeding line 429.

Figure 5A:
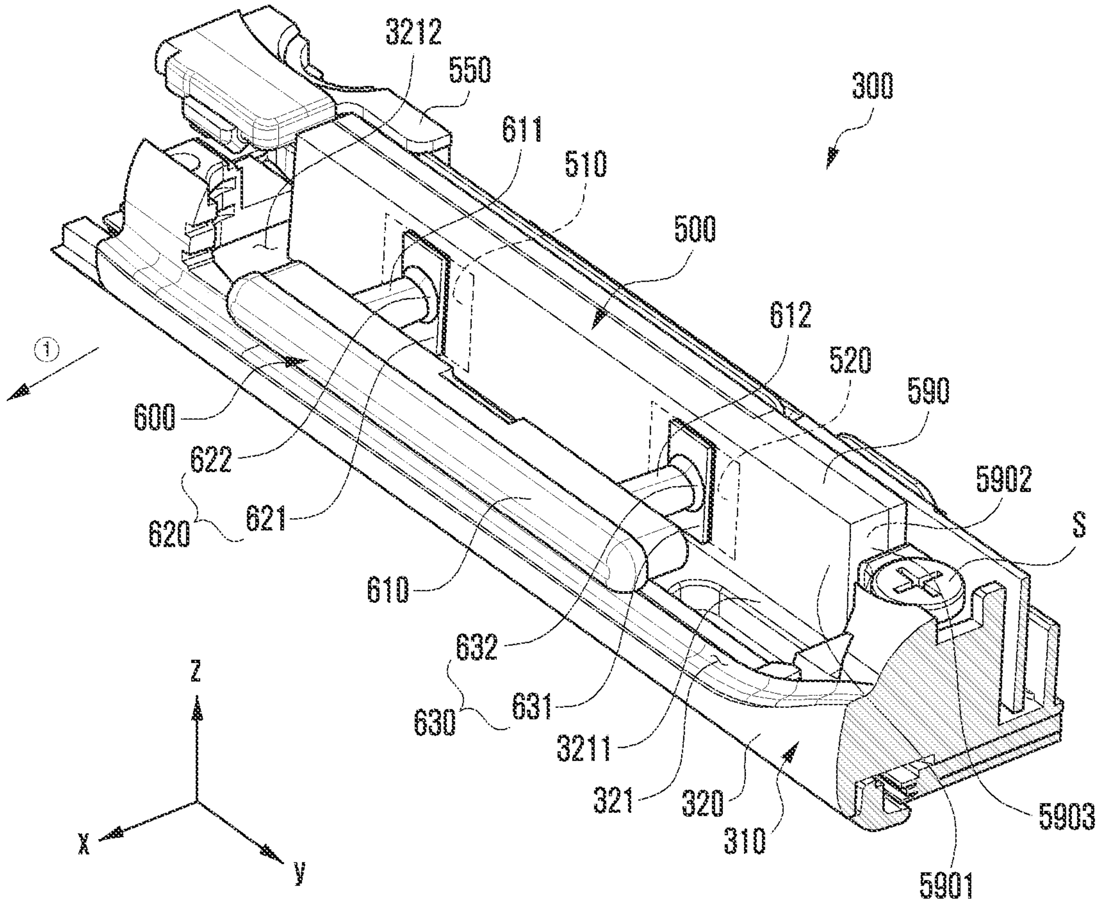
FIG. 5A is a partially cutaway perspective view illustrating an electronic device in which an antenna structure and a key button device are disposed according to an embodiment of the disclosure.

FIG. 5A is a partially cutaway perspective view illustrating an electronic device in which an antenna structure and a key button device are disposed according to an embodiment of the disclosure.

Figure 5B:
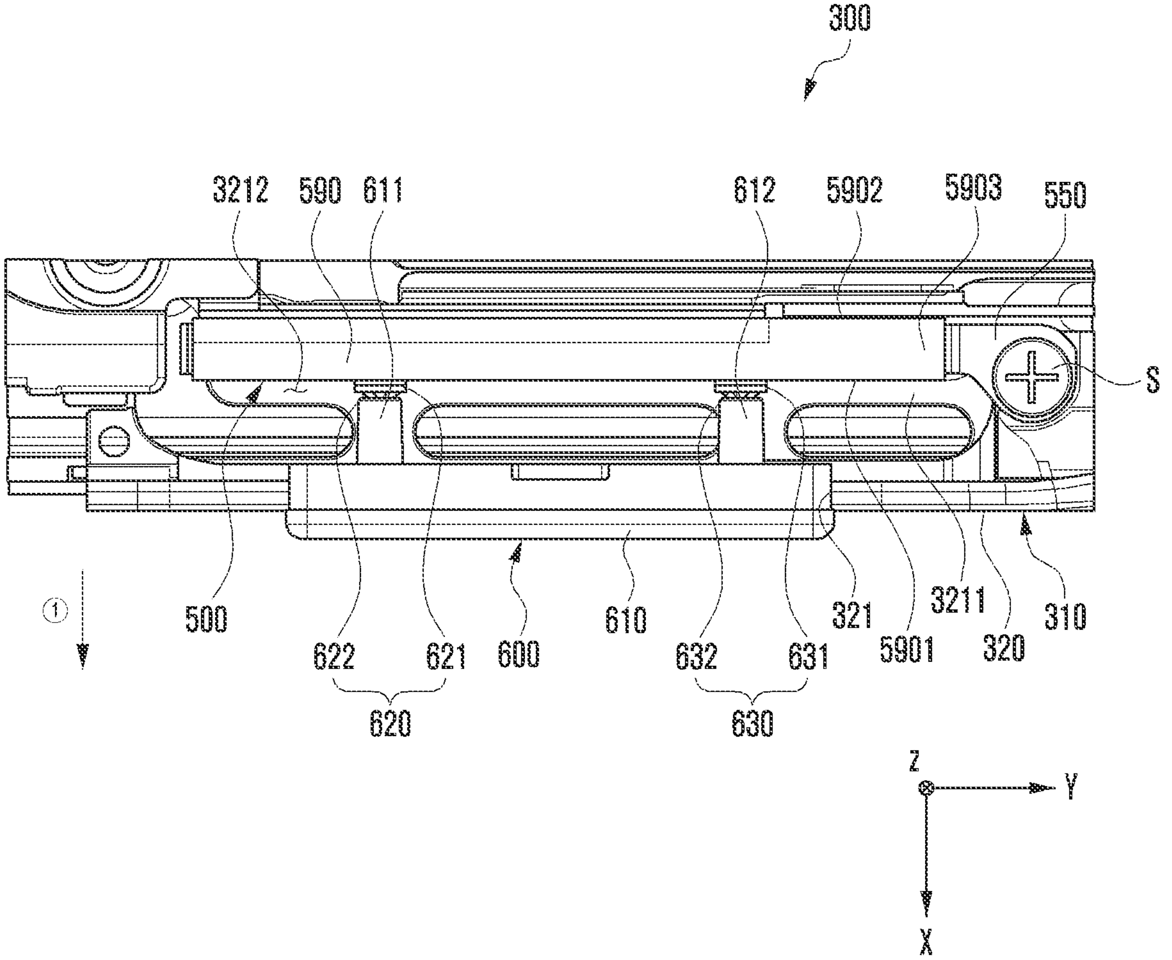
FIG. 5B is a top view illustrating the electronic device shown in FIG. 5A according to an embodiment of the disclosure.

FIG. 5B is a top view illustrating the electronic device shown in FIG. 5A according to an embodiment of the disclosure.

The electronic device 300 shown in FIGS. 5A and 5B may be similar, at least in part, to the electronic device 101 in FIG. 1 or the electronic device 300 in FIG. 3A, or may include other embodiments of the electronic device.

The antenna structure 500 (e.g., an antenna or antenna module) shown in FIGS. 5A and 5B may be similar, at least in part, to the antenna module 197 in FIG. 1 or the third RFIC 226 in FIG. 2, or may include other embodiments of the antenna structure.

The key button device 600 shown in FIGS. 5A and 5B may be similar, at least in part, to the input module 150 in FIG. 1 or the key input device 317 in FIG. 3A, or may include other embodiments of the key button device.

Referring to FIGS. 5A and 5B, the electronic device 300 (e.g., the electronic device 101 in FIG. 1 or the electronic device 300 in FIG. 3A) may include a housing 310 including a side member 320, the antenna structure 500 (e.g., an antenna or an antenna module) disposed in an inner space of the housing 310, and the key button device 600 facing at least in part the antenna structure 500 and exposed to be visible from the outside through at least a portion of the housing. According to an embodiment, the side member 320 may be formed as at least a portion of a side surface (e.g., the lateral surface 310C in FIG. 3A) of the electronic device 300 and may be disposed to be at least partially visible from the outside. According to an embodiment, the side member 320 may include a support member 3211 (e.g., a support structure) that extends at least in part into the inner space of the electronic device 300.

According to various embodiments, the antenna structure 500 may include a substrate 590 and conductive patches 510 and 520 as antenna elements disposed on the substrate 590. According to an embodiment, the antenna structure 500 may operate as an array antenna through the conductive patches 510 and 520. According to an embodiment, the substrate 590 may have a first substrate surface 5901 facing toward first direction (direction ①), a second substrate surface 5902 facing toward a direction opposite to the first substrate surface 5901, and a substrate side surface 5903 surrounding a space between the first substrate surface 5901 and the second substrate surface 5902. According to an embodiment, the electronic device 300 may include a wireless communication circuit (e.g., the wireless communication module 192 in FIG. 1, the RFIC 452 in FIG. 4B, or the wireless communication circuit 595 in FIG. 6A) electrically connected to the conductive patches 510 and 520 of the antenna structure 500. According to an embodiment, the wireless communication circuit 595 may be disposed on the second substrate surface 5902. In some embodiments, the wireless communication circuit 595 may be electrically connected to the conductive patches 510 and 520 disposed in the substrate 590 through an electrical connection member (e.g., an electrical connection member 597 in FIG. 17) spaced apart from the substrate 590 in the inner space of the electronic device 300. According to an embodiment, the conductive patches 510 and 520 may include a first conductive patch 510 and a second conductive patch 520 spaced apart from each other at a predetermined interval. In some embodiments, the conductive patches 510 and 520 may be replaced with a single conductive patch. In some embodiments, the conductive patches 510 and 520 may be replaced with three or more conductive patches spaced apart from each other at predetermined intervals. According to an embodiment, the wireless communication circuit 595 may be configured to transmit and/or receive a radio signal in a range of about 3 GHz to 100 GHz through the conductive patches 510 and 520.

According to various embodiments, the substrate 590 of the antenna structure 500 may be disposed in a manner to face the side member 320 in the inner space of the electronic device 300. For example, in the inner space of the electronic device 300, the substrate 590 may be disposed in order for the first substrate surface 5901 to face the side member 320, thereby inducing a beam pattern of the antenna structure 500 to be formed in the first direction (the direction ①) toward which the side member 320 faces. According to an embodiment, the substrate 590 may be disposed on a mounting portion 3212 provided through a structural shape of the support member 3211. According to an embodiment, the substrate 590 may be fixed to the mounting portion 3212 via a conductive plate 550 for supporting the substrate side surface 5903 and/or the second substrate surface 5902. For example, the substrate 590 may be fixed to the conductive plate 550 by taping or bonding, and the conductive plate 550 may be fixed to the mounting portion 3212 or the side member 320 through a fastening member such as a screw (S).

According to various embodiments, the key button device 600 may include a key button 610 and key modules 620 and 630. The key button 610 is exposed to be visible from the outside at least partially through an opening 321 formed in the side member 320 and has pressing protrusions 611 and 612 protruding in a substrate direction (a negative x-axis direction). The key modules 620 and 630 are disposed on the first substrate surface 5901 to be switched in response to a pressing operation of the key button 610. According to an embodiment, the key button 610 is disposed to be visible to the outside of the electronic device 300 and allows at least one function of the electronic device 300 to be performed through a user manipulation (e.g., press or touch). According to an embodiment, the at least one function may include various functions such as a volume up/down function, a wakeup function, a sleep function, or a power on/off function. According to an embodiment, when the first substrate surface 5901 is viewed from above, the key modules 620 and 630 may include a first key module 620 that overlaps with the first conductive patch 510 at least in part, and a second key module 630 that overlaps with the second conductive patch 520 at least in part. In some embodiments, when the antenna structure 500 includes three or more conductive patches, at least one conductive patch may be disposed at a position that does not correspond to the key modules 620 and 630. According to an embodiment, the pressing protrusions 611 and 612 of the key button 610 may include a first pressing protrusion 611 for pressing the first key module 620 and a second pressing protrusion 612 for pressing the second key module 630. According to an embodiment, the first pressing protrusion 611 and the second pressing protrusion 612 may be integrally formed with the key button 610, or may be provided separately and structurally combined with the key button 610.

According to various embodiments, the first key module 620 may include a first button substrate 621 (e.g., a key pad) disposed on the first substrate surface 5901, and a first conductive contact 622 (e.g., a metal dome) disposed on the first button substrate 621 and adjacent to or in contact with the first pressing protrusion 611. For example, when the first pressing protrusion 611 presses the first conductive contact 622 through the pressing of the key button 610, a switching operation may be performed through a circuit structure configured in the first button substrate 621. In some embodiments, when the first conductive contact 622 has a metal dome, a carbon contact, which is a circuit structure disposed above and spaced apart from the first button substrate 621, may be electrically connected through the deformation of the metal dome by the pressing of the first pressing protrusion 611, and thereby the switching operation may be performed. In some embodiments, when the key button 610 and the first pressing protrusion 611 are formed at least in part of a conductive material, the first button substrate 621 may perform the switching operation by detecting a change in capacitance by a user's touch. According to an embodiment, the second key module 630 may include a second button substrate 631 (e.g., a key pad) disposed on the first substrate surface 5901, and a second conductive contact 632 (e.g., a metal dome) disposed on the second button substrate 631 and adjacent to or in contact with the second pressing protrusion 612. According to an embodiment, the second key module 630 may be disposed on the first substrate surface 5901 in substantially the same manner as that of the first key module 620.

Although the key button device 600 according to an embodiment of the disclosure includes one key button 610 for pressing the key modules 620 and 630 through the pressing protrusions 611 and 612 spaced apart from each other at a specified interval, this is not construed as a limitation. For example, the key button device 600 may include two key buttons respectively disposed at positions corresponding to the pressing protrusions 611 and 612. In some embodiments, when three or more conductive patches are disposed in the antenna structure 500, the key button device 600 may include three or more key modules and at least one key button for pressing the key modules. In some embodiments, the key button device 600 may be replaced with at least one other electronic component. For example, the at least one other electronic component may include a sensor module (e.g., the sensor module 319 in FIG. 3B), a camera module (e.g., the camera module 312 in FIG. 3B), a speaker device (e.g., the external speaker 307 in FIG. 3A), a microphone device (e.g., the microphone 303 in FIG. 3A), or a connector port (e.g., the connector hole 308 in FIG. 3A). In some embodiments, the at least one other electronic component may be disposed to correspond to the outside of the electronic device 300 through the structural shape of the housing 310. In some embodiments, the substrate 590 of the antenna structure 500 may be disposed to face a rear cover (e.g., the rear plate 311 in FIG. 3B) of the electronic device 300 such that a beam pattern is formed in a direction (e.g., the negative z-axis direction in FIG. 3B) toward which the rear surface faces. In this case, the key button 610 of the key button device 600 may be exposed to be seen from the outside on the rear surface (e.g., the rear surface 310B in FIG. 3B) of the electronic device 300.

According to various embodiments, the antenna structure 500 may include an electrical connection structure for electrically connecting the key button device 600 disposed on the first substrate surface 5901 of the substrate 590 to the main board (e.g., the printed circuit board 340 in FIG. 3C) of the electronic device 300. According to an embodiment, the electrical connection structure may be disposed through an internal structure of the substrate, and a detailed description will be given below.

The electronic device 300 according to embodiments of the disclosure includes the antenna structure 500 and the key button device 600 disposed to overlap at least in part with the antenna structure 500, and has a mutual arrangement structure to reduce the radiation performance degradation caused by the key button device 600, thereby realizing an efficient use of a component mounting space without affecting the radiation performance.

Figure 6A:
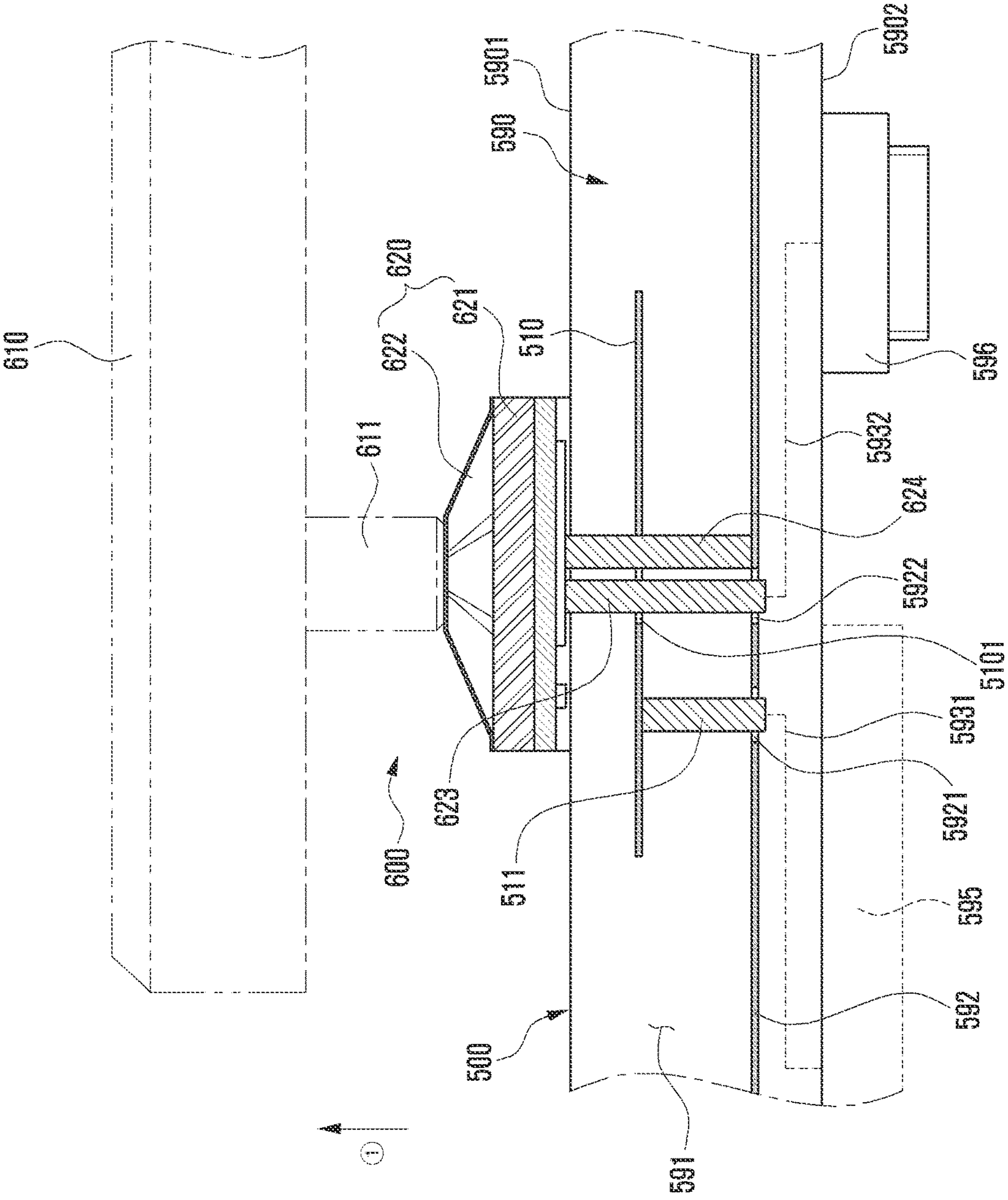
FIG. 6A is a cross-sectional view partially illustrating an antenna structure including a key button device according to an embodiment of the disclosure.

FIG. 6A is a cross-sectional view partially illustrating an antenna structure including a key button device according to an embodiment of the disclosure.

Figure 6B:
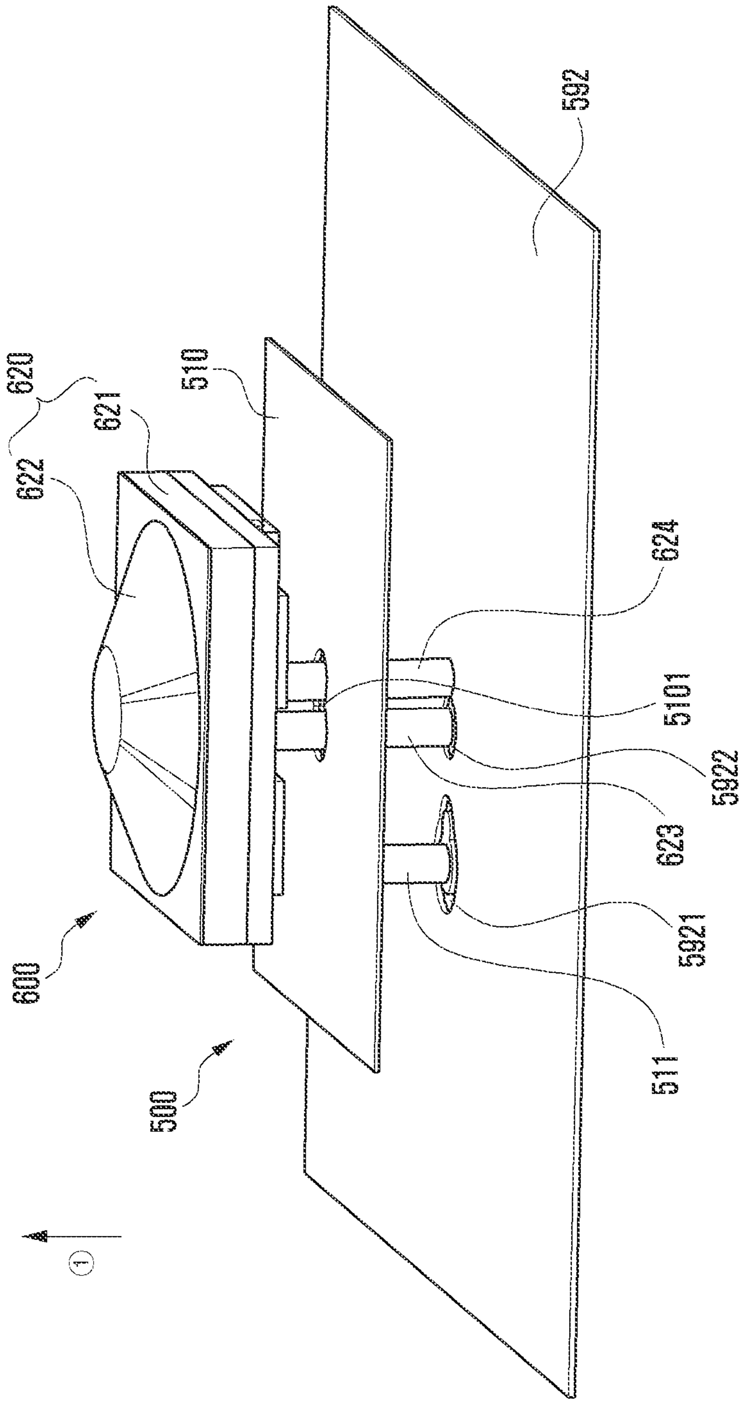
FIG. 6B is a perspective view schematically illustrating an arrangement relationship between a key button device and a conductive patch according to an embodiment of the disclosure.

FIG. 6B is a perspective view schematically illustrating an arrangement relationship between a key button device and a conductive patch according to an embodiment of the disclosure.

FIGS. 6A and 6B merely illustrate the arrangement relationship between the first key module 620 of the key button device 600 and the first conductive patch 510 of the antenna structure 500, but the arrangement relationship between the second key module 630 and the second conductive patch 520 of the antenna structure 500 may also be substantially the same. In some embodiments, as shown in FIGS. 6A and 6B, the electronic device 300 may include the antenna structure 500 having a single conductive patch 510 corresponding to the key button device 600 having a single key module 620.

Referring to FIGS. 6A and 6B, the electronic device (e.g., the electronic device 300 in FIG. 5A) may include the antenna structure 500 and the key button device 600 disposed to overlap at least in part with the antenna structure 500. According to an embodiment, the antenna structure 500 may include the substrate 590 having the first substrate surface 5901 facing toward the first direction (direction ①) and the second substrate surface 5902 facing toward a direction opposite to the first substrate surface 5901, and the first conductive patch 510 (hereinafter, referred to as the 'conductive patch') disposed between the first substrate surface 5901 and the second substrate surface 5902. According to an embodiment, the conductive patch 510 may be disposed in an insulating layer 591 between the first and second substrate surfaces 5901 and 5902 or disposed to be exposed through at least a portion of the first substrate surface. According to an embodiment, the substrate 590 may include a ground layer 592. According to an embodiment, the conductive patch 510 may be disposed between the ground layer 592 and the first substrate surface 5901 in the insulating layer 591. According to an embodiment, the antenna structure 500 may include a power feeder 511 disposed to penetrate at least in part vertically through the insulating layer 591 and having one end electrically connected to at least a portion of the conductive patch 510. According to an embodiment, the other end of the power feeder 511 may be electrically connected to the wireless communication circuit 595 disposed on the second substrate surface 5902 through a first wiring structure 5931 (e.g., an electrical wiring) disposed in the insulating layer 591 between the ground layer 592 and the second substrate surface 5902. According to an embodiment, the power feeder 511 may include a conductive via disposed to at least partially pass through a first through-hole 5921 formed in the ground layer 592.

According to various embodiments, the key button device 600 may be disposed on the first substrate surface 5901 of the antenna structure 500. According to an embodiment, the key button device 600 may include the first key module 620 (hereinafter, the 'key module') disposed on the first substrate surface 5901, and the key button 610 for operating the key module 620 through a user's manipulation. According to an embodiment, at least a portion of the key button 610 may be exposed through an opening (e.g., the opening 321 in FIG. 5A) formed in at least a portion of the side member (e.g., the side member 320 in FIG. 5A) so as to be visible from the outside and be manipulatable. According to an embodiment, the key button 610 may include the first pressing protrusion 611 (hereinafter, the 'pressing protrusion') that is extended to be in contact with or close to the key module 620. According to an embodiment, the first key module 620 may include the first button substrate 621 (e.g., a key pad) disposed on the first substrate surface 5901, and the first conductive contact 622 (hereinafter, the 'conductive contact') disposed on the first button substrate 621 (hereinafter, the 'button substrate'). According to an embodiment, the conductive contact 622 may include a metal dome that is pressed through the pressing protrusion 611.

According to various embodiments, the antenna structure 500 may include at least a part of an electrical connection structure for connecting the key button device 600 to the main board (e.g., the printed circuit board 340 in FIG. 3C) of the electronic device (e.g., the electronic device 300 in FIG. 5A). According to an embodiment, the electrical connection structure may include one or more conductive vias 623 and 624 disposed to penetrate at least in part the substrate 590. According to an embodiment, the one or more conductive vias 623 and 624 may include a first conductive via 623 (e.g., a signal via) disposed in the insulating layer 591 of the substrate 590 so as to pass through a second through-hole 5101 formed in the conductive patch 510 and a third through-hole 5922 formed in the ground layer 592 from the key module 620, and a second conductive via 624 (e.g., a ground via) disposed to penetrate the conductive patch 510 from the key module 620 and electrically connected to the ground layer 592. According to an embodiment, the first conductive via 623 may be disposed to remain electrically isolated from the conductive patch 510 and the ground layer 592. According to an embodiment, the second conductive via 624 may remain electrically isolated from the conductive patch 510. In another embodiment, the second conductive via 624 may be connected to the ground layer 592 while being electrically connected to the conductive patch 510. According to an embodiment, the first conductive via 623 may be electrically connected to a connector 596 (e.g., a B2B connector) for the key button device disposed on the second substrate surface 5902 through a second wiring structure 5932 (e.g., an electrical wiring) disposed in the insulating layer 591 between the ground layer 592 and the second substrate surface 5902. In some embodiments, the conductive patch 510 and/or the wireless communication circuit 595 may be electrically connected to the main board (e.g., the printed circuit board 340 in FIG. 3C) through another electrical connection member (e.g., FRC; flexible printed circuit board (FPCB) type RF cable, or a coaxial cable) that is extended from the substrate 590 and provided separately from the connector 596. In some embodiments, when the wireless communication circuit 595 is disposed at a location other than the substrate 590 in the inner space of the electronic device (e.g., the electronic device 300 in FIG. 5A), the first wiring structure 5931 may also be electrically connected to the connector 596, and thereby an RF signal of the conductive patch 510 and a key input signal of the key module 620 may be transmitted to the main board (e.g., the printed circuit board 340 in FIG. 3C) through the connector 596. In some embodiments, although the wireless communication circuit 595 is disposed on the second substrate surface 5902, the RF signal of the conductive patch 510 and the key input signal of the key module 620 may be transmitted to the main board (e.g., the printed circuit board 340 in FIG. 3C) through the connector 596.

Figure 6C:
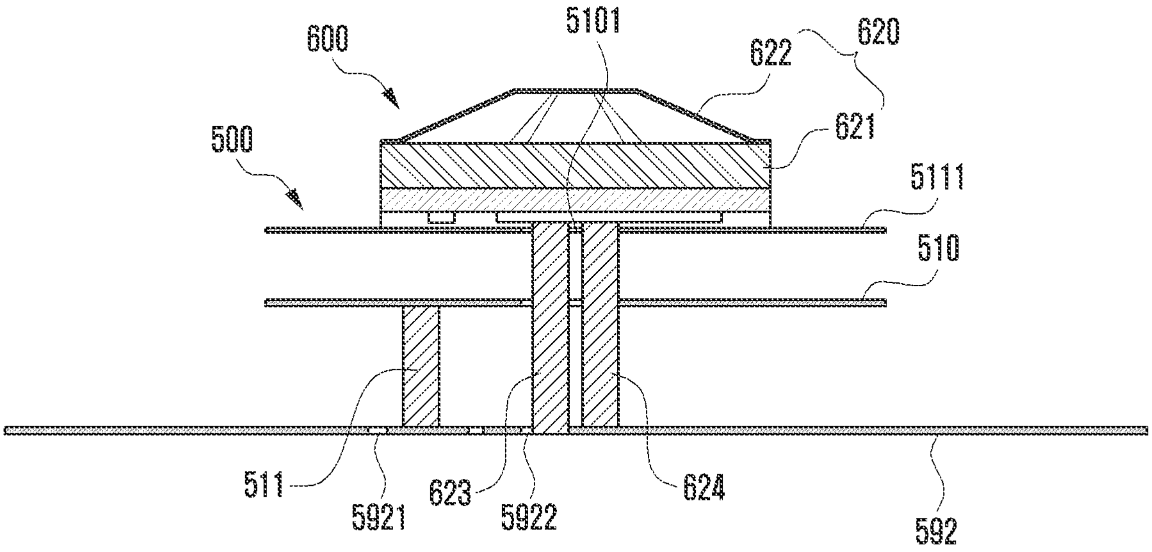
FIG. 6C is a cross-sectional view partially illustrating an antenna structure including a key button device according to an embodiment of the disclosure.

FIG. 6C is a cross-sectional view partially illustrating an antenna structure including a key button device according to various embodiments of the disclosure. Compared to the configuration shown in FIG. 6A, the antenna structure 500 may further include at least one conductive dummy patch 5111 disposed in the insulating layer 591 between the first substrate surface 5901 and the conductive patch 510. According to an embodiment, the dummy patch 5111 may be spaced apart from the conductive patch 510 at a predetermined interval so as to be capacitively coupled to the conductive patch 510. According to an embodiment, the dummy patch 5111 may have a smaller size than the conductive patch 510. In some embodiments, the dummy patch 5111 may have a size substantially the same as or larger than the conductive patch 510. According to an embodiment, the dummy patch 5111 may help to expand the bandwidth of the operating frequency band of the antenna structure 500 without degrading the radiation performance.

Figure 7A:
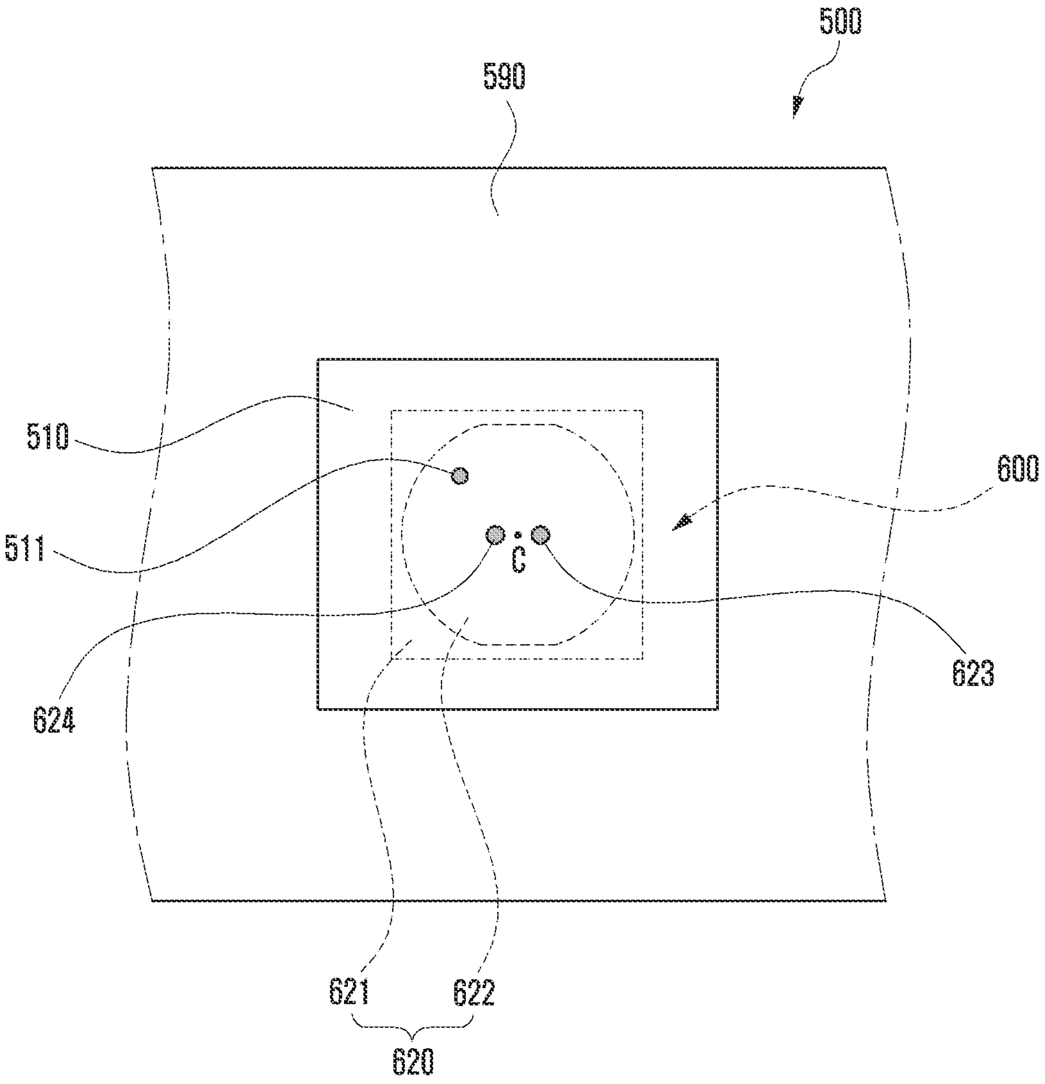
FIGS. 7A and 7B are views illustrating the arrangement structure of conductive vias according to various embodiments of the disclosure.
Figure 7B:
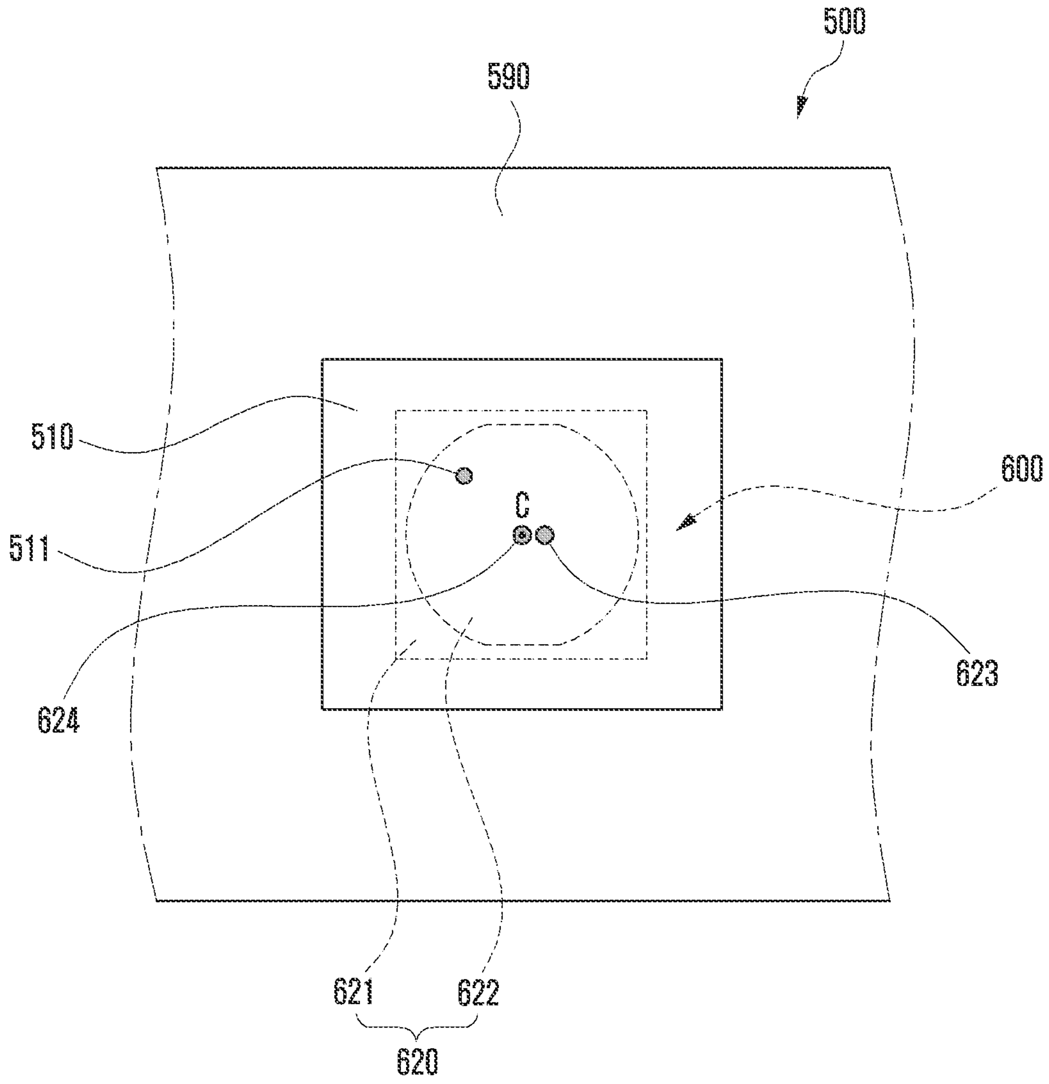

FIGS. 7A and 7B are views illustrating the arrangement structure of conductive vias according to various embodiments of the disclosure.

FIGS. 7A and 7B are top views of the substrate 590 of the antenna structure 500. In order to explain the arrangement positions of the conductive vias 623 and 624 connected to the key module 620, the key button (e.g., the key button 610 in FIG. 6A) is not depicted.

Referring to FIG. 7A, the antenna structure 500 may include the conductive vias 623 and 624 disposed in the substrate 590 and electrically connected to the key module 620. According to an embodiment, the conductive vias 623 and 624 may include the first conductive via 623 that transmits the key input signal of the key module 620, and the second conductive via 624 that connects the key module 620 and the ground layer (e.g., the ground layer 592 in FIG. 6A). According to an embodiment, as the conductive vias 623 and 624 are disposed in a region overlapping with the center C of the conductive patch 510 or a position close to the center C when the substrate 590 is viewed from above, it may be advantageous in reducing the radiation performance degradation of the antenna structure 500. For example, a patch antenna including the conductive patch 510 has an electric field distribution that is symmetrical on the left and right with respect to the vertical direction of the operating polarized wave, and thereby it may have, at the center C of the conductive patch 510, a virtual ground plane (a virtual short plane or e-plane) where the electric field becomes zero in the vertical direction of the polarized wave. Therefore, at that location, because there is no electric field between the conductive patch 510 and the ground layer (e.g., the ground layer 592 in FIG. 6A), the radiation performance degradation of the antenna structure 500 can be reduced even if the conductive vias 623 and 624 are disposed. In another example, because the patch antenna including the conductive patch 510 has a stronger electric field from the center C to edge portions, a metal structure (e.g., the conductive vias 623 and 624) positioned at the center of the conductive patch 510 may relatively less affect the radiation performance than positioned in the edge portions.

According to various embodiments, using the structural characteristics of the patch antenna including the conductive patch 510, the conductive vias 623 and 624 according to embodiments of the disclosure may be disposed to overlap with a point close to the center C of the conductive patch 510 when the substrate 590 is viewed from above. According to an embodiment, when the substrate 590 is viewed from above, the first conductive via 623 and the second conductive via 624 may be disposed at positions that overlap with points symmetrical to each other with respect to the center C of the conductive patch 510. Although the two conductive vias 623 and 624 are illustrated as being spaced apart from each other with respect to the center C for convenience of description, this is not construed as a limitation. For example, the two conductive vias 623 and 624 may be disposed to be in contact with each other with respect to the center C.

With respect to FIG. 7B, one (e.g., the second conductive via 624) of the two conductive vias 623 and 624 may be disposed at a position overlapping with the center C of the conductive patch 510 when the substrate 590 is viewed from above. For example, the second conductive via 624 connecting the key module 620 to the ground layer (e.g., the ground layer 592 in FIG. 6A) of the substrate 590 may be disposed at a position overlapping with the center C. In an embodiment, because the first conductive via 623 is more advantageous as it is disposed closer to the center C, it may be disposed at a position in contact with the second conductive via 624. In another embodiment, the first conductive via 623 may be disposed at a position overlapping with the center C, and the second conductive via 624 may be disposed at a position closest to the first conductive via 623 as much as possible.

Figure 7C:
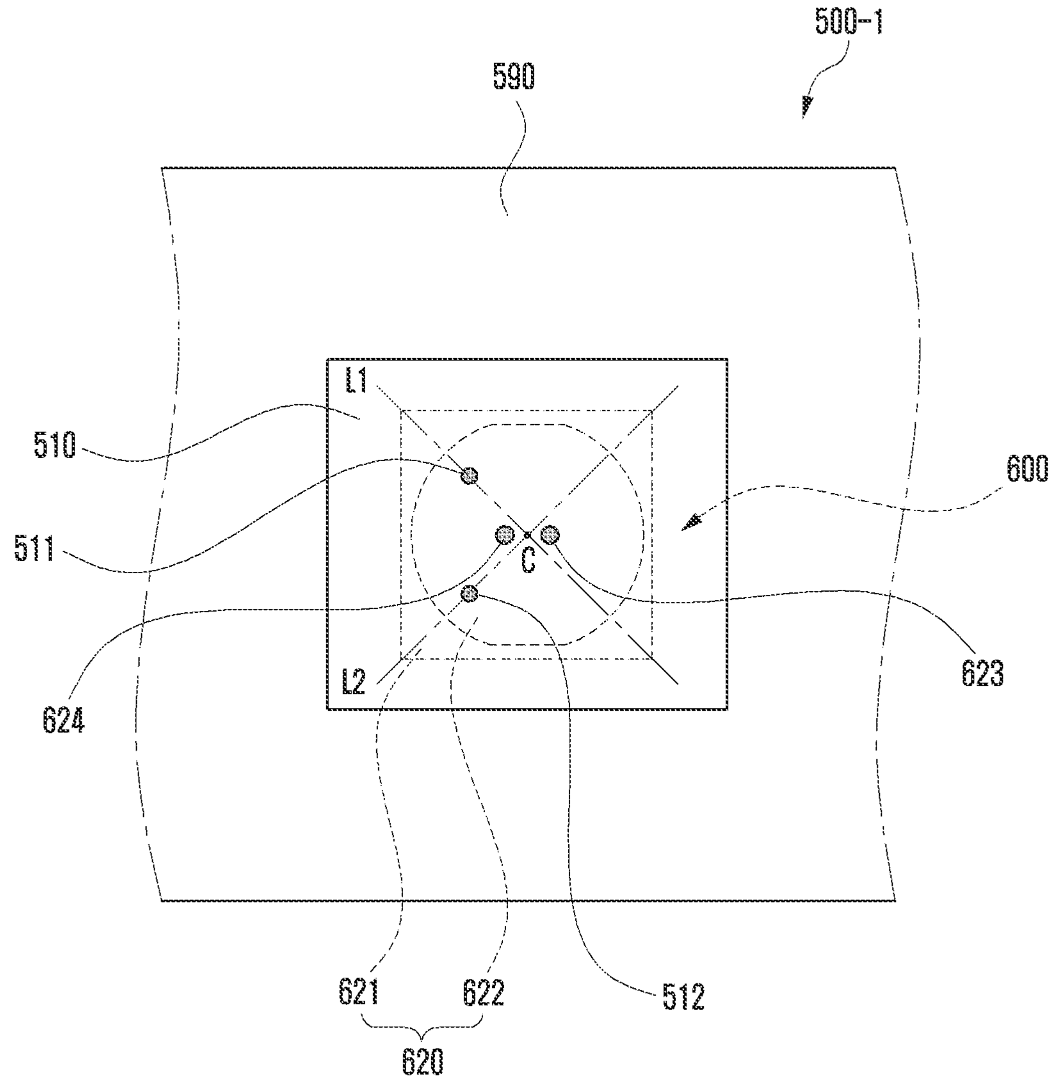
FIGS. 7C and 7D are views illustrating the arrangement structure of power feeders according to various embodiments of the disclosure.
Figure 7D:
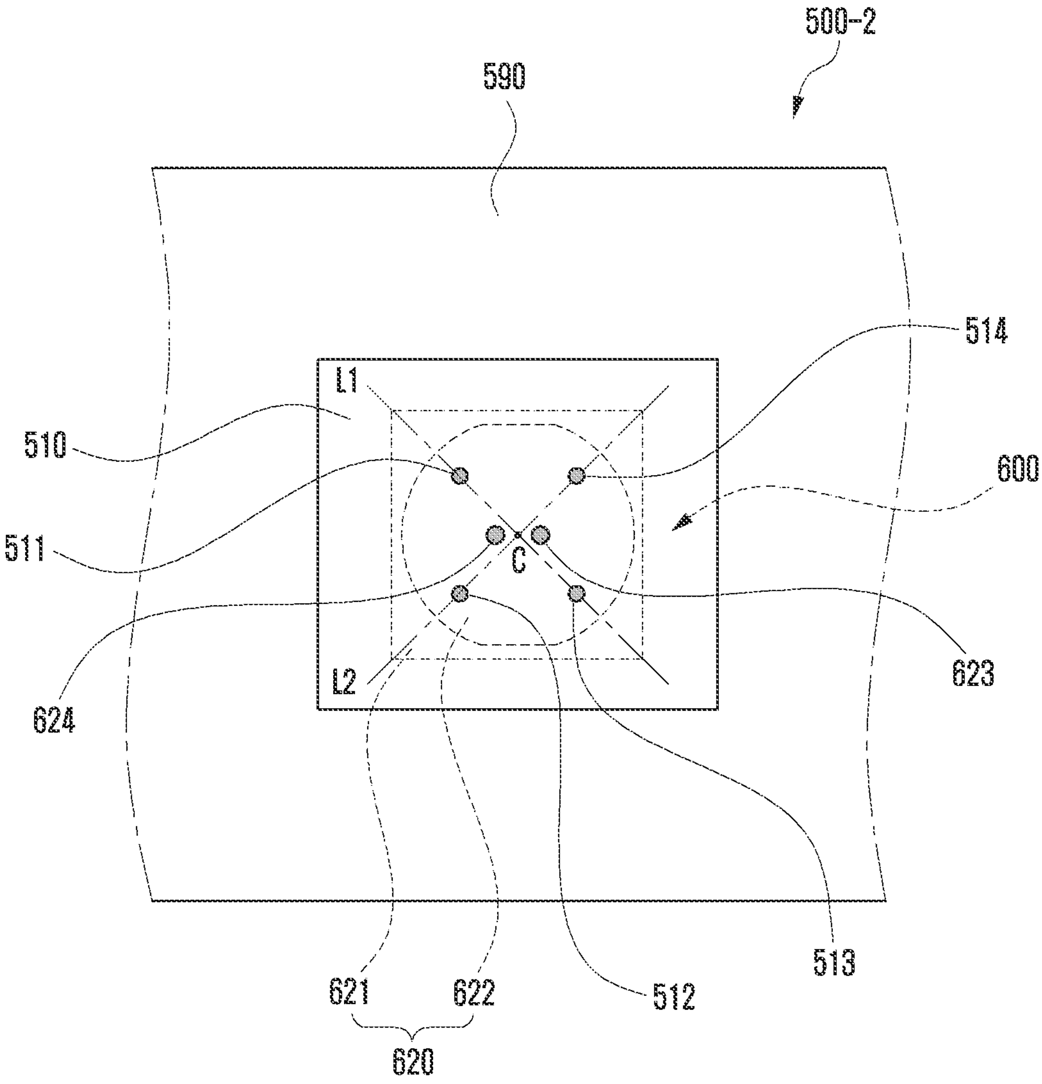

FIGS. 7C and 7D are views illustrating the arrangement structure of power feeders according to various embodiments of the disclosure.

Referring to FIG. 7C, an antenna structure 500-1 may include two power feeders 511 and 512 disposed in the conductive patch 510, thereby operating to have dual polarization. In this case, when the substrate 590 is viewed from above, the antenna structure 500-1 may include a first power feeder 511 disposed on a first virtual line L1 passing through the center C, and a second power feeder 512 disposed on a second virtual line L2 passing through the center C and crossing the first virtual line L1 at a specified angle. According to an embodiment, the specified angle may include 90 degrees. According to an embodiment, the antenna structure 500-1 that includes the two power feeders 511 and 512 and supports the dual polarization may also include the conductive vias 623 and 624 disposed at positions overlapping with points close to the center C when the substrate 590 is viewed from above. According to an embodiment, the conductive vias 623 and 624 may be symmetrically disposed with respect to the center C, or alternatively one conductive via 624 may be disposed at a position overlapping with the center C, and the other conductive via 623 may be disposed to be in close proximity to the conductive via 624. In an embodiment, the conductive vias 623 and 624 may be disposed at positions overlapping with points close to the center C without overlapping with the first and second virtual lines L1 and L2. This is because, when the antenna structure 500-1 supports polarization diversity, the conductive patch 510 generates two perpendicular polarized waves, the virtual ground planes where the electric field becomes zero become perpendicular to each other at the center C of the conductive patch 510, and thereby the center C of the conductive patch 510 operates as a virtual GND point. In some embodiments, the conductive vias 623 and 624 may be arranged in a direction perpendicular to the illustrated arrangement direction.

Referring to FIG. 7D, an antenna structure 500-2 may operate as a dual-feed dual-polarization antenna that further includes a third power feeder 513 disposed on the first virtual line L1 to be symmetrical with the first power feeder 511 with respect to the center C of the conductive patch 510 and a fourth power feeder 514 disposed on the second virtual line L2 to be symmetrical with the second power feeder 512 with respect to the center C. Even in this case, the conductive vias 623 and 624 may be disposed in the substrate 590 at positions overlapping with points close to the center C, thereby not only reducing deterioration in radiation performance of the antenna structure 500-2, but also helping to implement an improved arrangement structure of the key button device (e.g., the key button device 600 in FIG. 6A).

Figure 8:
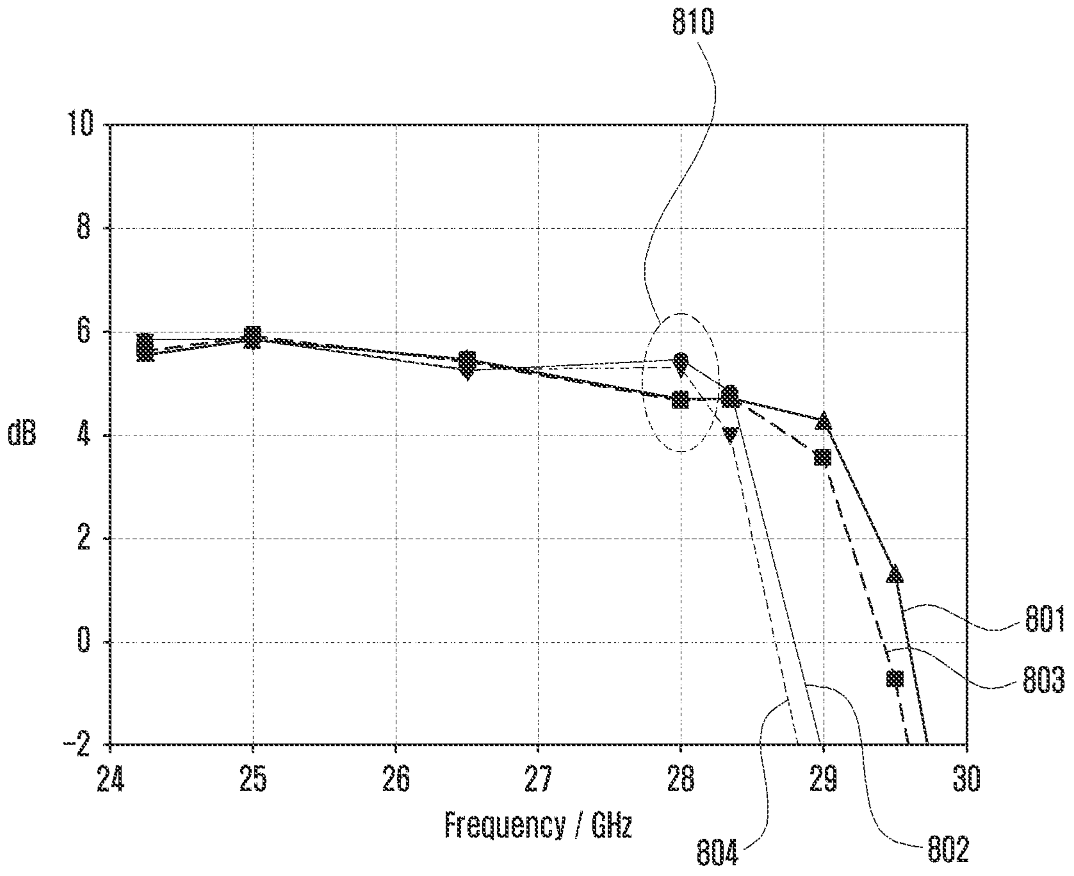
FIG. 8 is a graph illustrating the radiation performance of an antenna structure depending on the presence or absence of a key button device in the configuration of FIG. 7C according to an embodiment of the disclosure.

FIG. 8 is a graph illustrating the radiation performance of an antenna structure depending on the presence or absence of a key button device in the configuration of FIG. 7C according to an embodiment of the disclosure.

Referring to FIG. 8, it can be seen that, in the antenna structure 500-1 of FIG. 7C supporting dual polarization, the gains of vertical polarization (graph 801) and horizontal polarization (graph 802) when the key button device (e.g., the key button device 600 in FIG. 6A) is disposed on the substrate (e.g., the substrate 590 in FIG. 7C) through the arrangement structure of two conductive vias (e.g., the conductive vias 623 and 624 in FIG. 7C) do not change significantly enough to affect the radiation performance in an operating frequency band 810 (e.g., about 28 GHz) compared to the gains of vertical polarization (graph 803) and horizontal polarization (graph 804) when the key button device 600 is not disposed on the substrate 590. This means that, even if the conductive patch 510 of the antenna structure 500-1 and the key button device 600 are disposed to overlap with each other, the radiation performance of the antenna structure 500-1 is not substantially deteriorated through the two conductive vias 623 and 624 are arranged at the center C or close to the center C.

Figure 9:
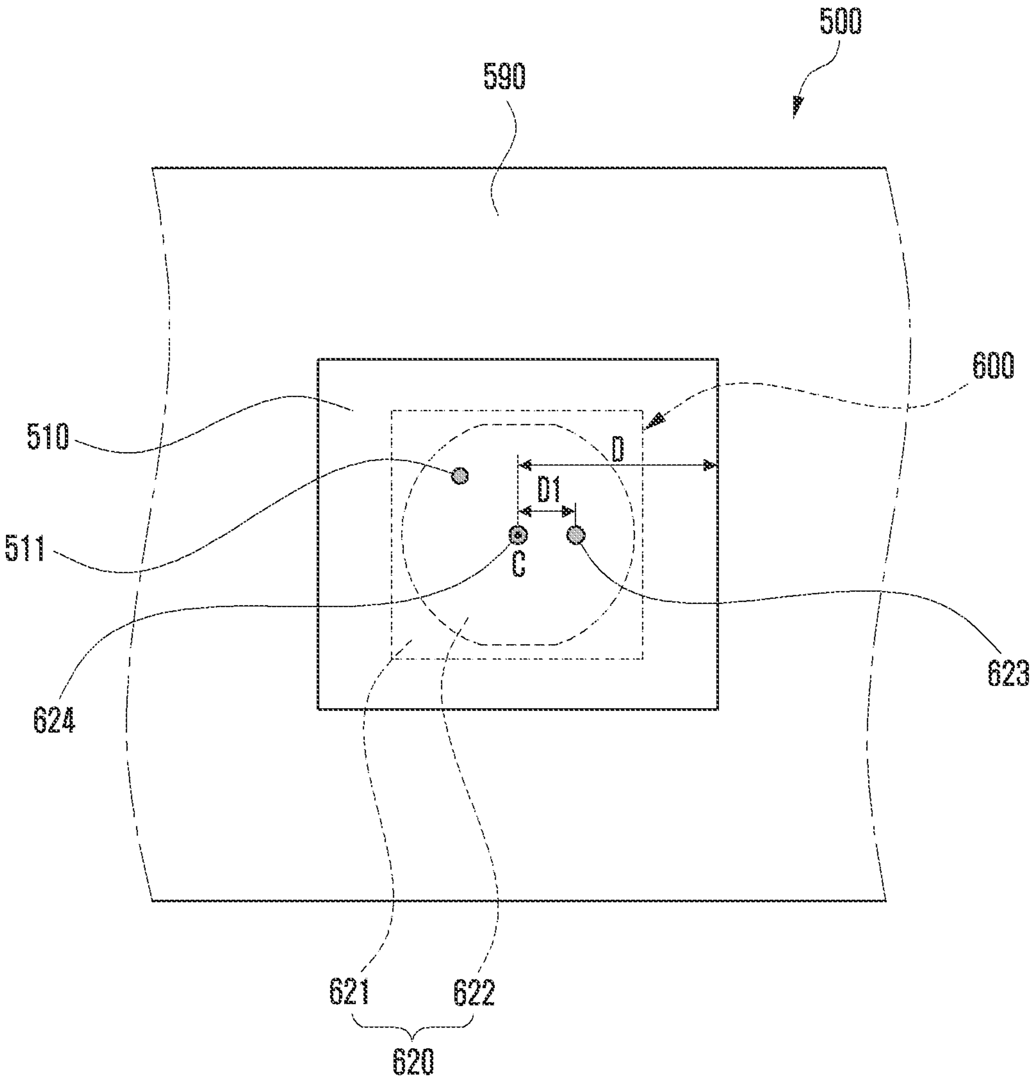
FIG. 9 is a diagram illustrating the arrangement structure of conductive vias according to an embodiment of the disclosure.

FIG. 9 is a diagram illustrating the arrangement structure of conductive vias according to an embodiment of the disclosure.

Referring to FIG. 9, the antenna structure 500 may include the conductive vias 623 and 624 disposed in the substrate 590 and electrically connected to the key module 620. According to an embodiment, the conductive vias 623 and 624 may include the first conductive via 623 that transmits the key input signal of the key module 620, and the second conductive via 624 that connects the key module 620 and the ground layer (e.g., the ground layer 592 in FIG. 6A). According to an embodiment, when the substrate 590 is viewed from above, the antenna structure 500 may include the second conductive via 624 disposed at a position overlapping with the center C of the conductive patch 510, and the first conductive via 623 disposed at a position having a specified separation distance D1 from the second conductive via 624. According to an embodiment, when the substrate 590 is viewed from above, the first conductive via 623 may be disposed within a distance of about 30% of a linear distance (D) from the second conductive via 624 disposed at the center C of the conductive patch 510 to the end of the conductive patch 510. According to an embodiment, even when both the first conductive via 623 and the second conductive via 624 are disposed in a region that does not overlap with the center C of the conductive patch 510, each of the first and second conductive vias 623 and 624 may be disposed such that each separation distance D1 from the center C is within a distance of 30% of the linear distance D between the center C of the conductive patch 510 and the end of the conductive patch.

Figure 10:
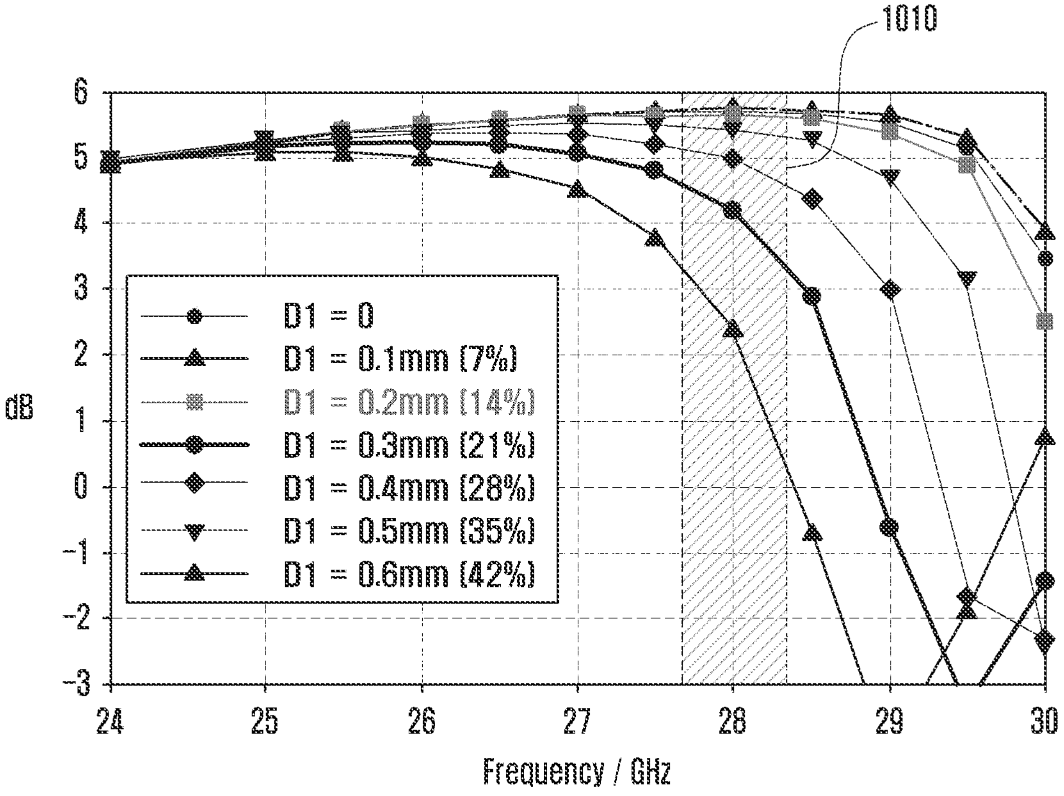
FIG. 10 is a graph illustrating the radiation performance of an antenna structure depending on a separation distance between two conductive vias of FIG. 9 according to an embodiment of the disclosure.

FIG. 10 is a graph illustrating the radiation performance of an antenna structure depending on a separation distance between two conductive vias of FIG. 9 according to an embodiment of the disclosure.

Referring to FIG. 10, it can be seen that the gain of the antenna structure (e.g., the antenna structure 500 in FIG. 9) decreases in the operating frequency band 1010 (e.g., about 28 GHz band) when the separation distance (e.g., the separation distance D1 in FIG. 9) of the first conductive via (e.g., the first conductive via 623 in FIG. 9) from the second conductive via (e.g., the second conductive via 624 in FIG. 9) disposed at a position overlapping with the center (e.g., the center C in FIG. 9) of the conductive patch (e.g., the conductive patch 510 in FIG. 9) toward the edge portion increases gradually. For example, when the first conductive via 623 is positioned at about a 30% point (e.g., a 28% point) where the separation distance D1 is about 0.4 mm from the second conductive via (e.g., the center C of the conductive patch 510), it was found that the gain decreased by about 1 dB. Also, when the separation distance (D1) is changed to about 0.6 mm corresponding to about a 50% point (e.g., a 42% point), it was found that the gain decreased by more than 2 dB. From this result, it can be seen that, when the first conductive via 623 and/or the second conductive via 624 are positioned based on the center C within about 30% of the linear distance D from the center C to the edge portion of the conductive patch 510, the antenna structure 500 can be used without significant performance degradation. However, in case of being disposed at the separation distance D1 that is farther than the above from the center C, it may be difficult to use due to deterioration in performance.

Figure 11:
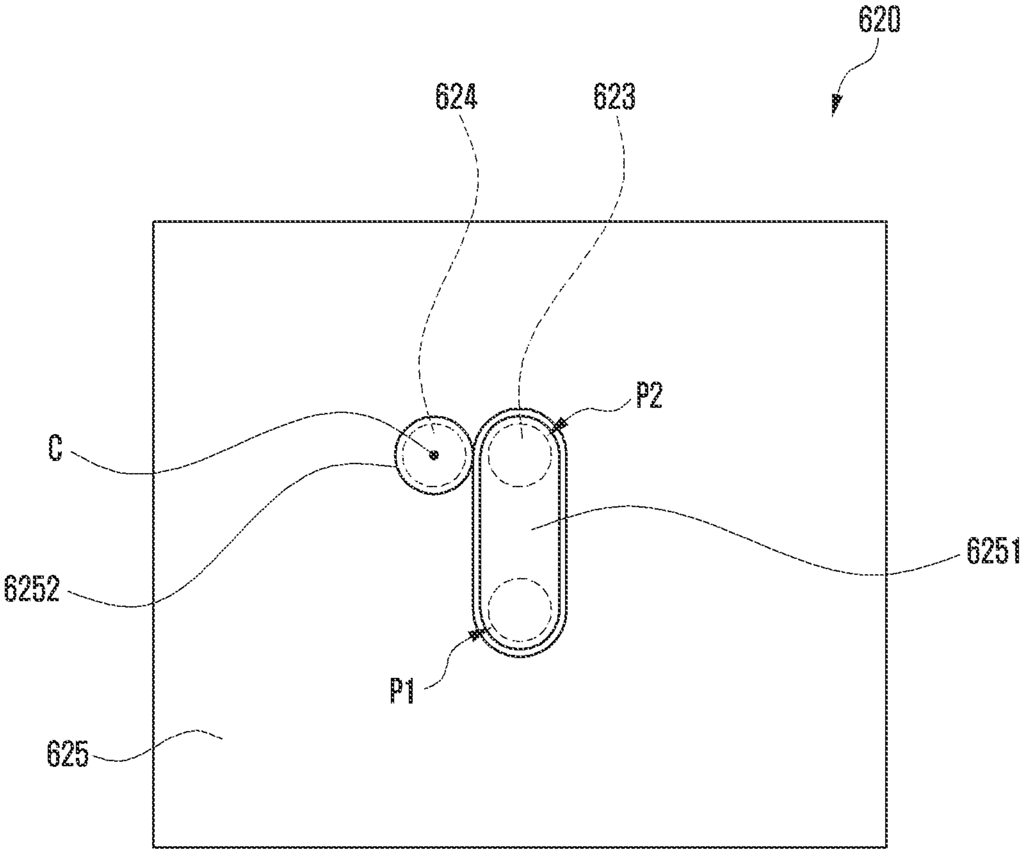
FIG. 11 is a diagram illustrating the arrangement structure of conductive pads included in an electronic component according to an embodiment of the disclosure.

FIG. 11 is a diagram illustrating the arrangement structure of conductive pads included in an electronic component according to an embodiment of the disclosure.

Referring to FIG. 11, the key module 620 may include a surface mount device (SMD) pad 625 disposed between the first substrate surface (e.g., the first substrate surface 5901 in FIG. 6A) of the substrate (e.g., the substrate 590 in FIG. 6A) and the button substrate 621. According to an embodiment, the SMD pad 625 may include a conductive pad 6251 for electrical connection to the first conductive via 623 (e.g., a signal via) exposed to the first substrate surface (e.g., first substrate surface 5901 in FIG. 6A) of the substrate (e.g., the substrate 590 in FIG. 6A), and a connection part 6252 for electrical connection to the second conductive via 624 (e.g., a ground via). According to an embodiment, the conductive pad 6251 and the connection part 6252 may be selectively electrically connected to each other through the conductive contact (e.g., the conductive contact 622 in FIG. 6A) of the key button device (e.g., the key button device 600 in FIG. 6A). According to an embodiment, the conductive pad 6251 and the connection part 6252 are disposed at positions overlapping with the first conductive via 623 and the second conductive via 624 exposed on the first substrate surface 5901 when the substrate 590 is viewed from above, so that they can be electrically connected to each other merely by an operation in which the key module 620 is mounted on the first substrate surface 5901. According to an embodiment, the conductive pad 6251 and the connection part 6252 may be electrically connected to the first conductive via 623 and the second conductive via 624, respectively, through at least one of soldering, conductive taping, conductive bonding, and/or electrical connection member (e.g., conductive contact spring).

According to various embodiments, depending on the arrangement position of the key button 610 and/or a design of the key module 620 (e.g., the arrangement position of the conductive contact 622), the conductive pad 6251 may be eccentrically disposed to have a certain separation distance from the center C of the conductive patch (e.g., the conductive patch 510 in FIG. 6A) rather than corresponds to the first conductive via 623. In this case, the conductive pad 6251 is formed to have an elongated shape, so that the conductive contact (e.g., the conductive contact 622 in FIG. 6A) of the key module may be electrically connected at a first point P1 of the conductive pad 6251, and the first conductive via 623 may be electrically connected at a second point P2 of the conductive pad 6251 closer to the center C of the conductive patch 510 than the first point P1. Accordingly, by forming the conductive pad 6251 to have an elongated shape and allowing the first conductive via 623 closer to the center C, it is possible to reduce the deterioration in radiation performance of the antenna structure (e.g., the antenna structure 500 in FIG. 6A). In some embodiments, the connection pad 6251 may also be electrically connected to the second conductive via 624 in substantially the same manner. In some embodiments, the conductive pad 6251 and the connection part 6252 of the SMD pad 625 may be formed directly on the button substrate (e.g., the button substrate 621 in FIG. 6A). In some embodiments, the SMD pad 625 including the conductive pad 6251 and the connection part 6252 may be replaced with the dummy patch 5111 in FIG. 6C.

Figure 12A:
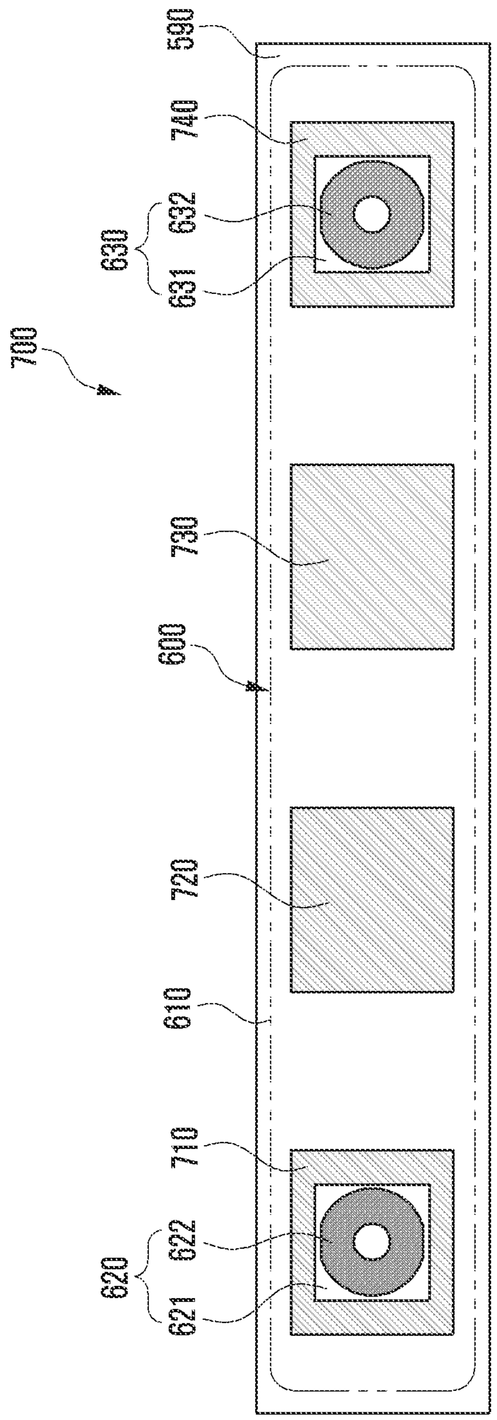
FIGS. 12A, 12B, and 12C are diagrams illustrating the configuration of an antenna structure including a key button device according to various embodiments of the disclosure.
Figure 12B:
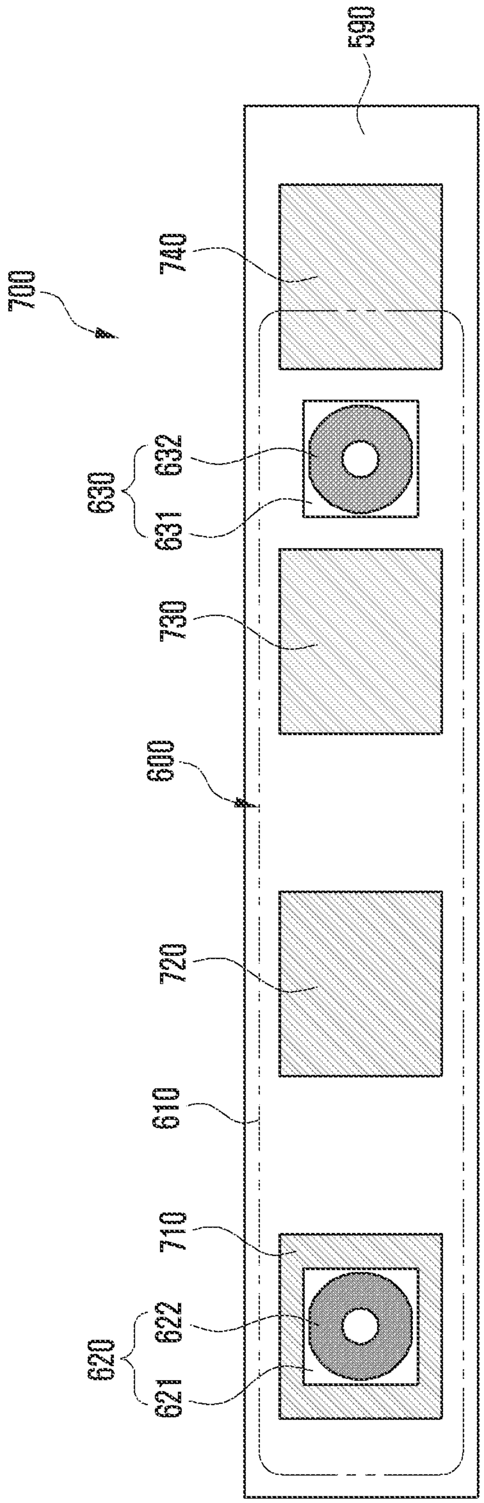
Figure 12C:
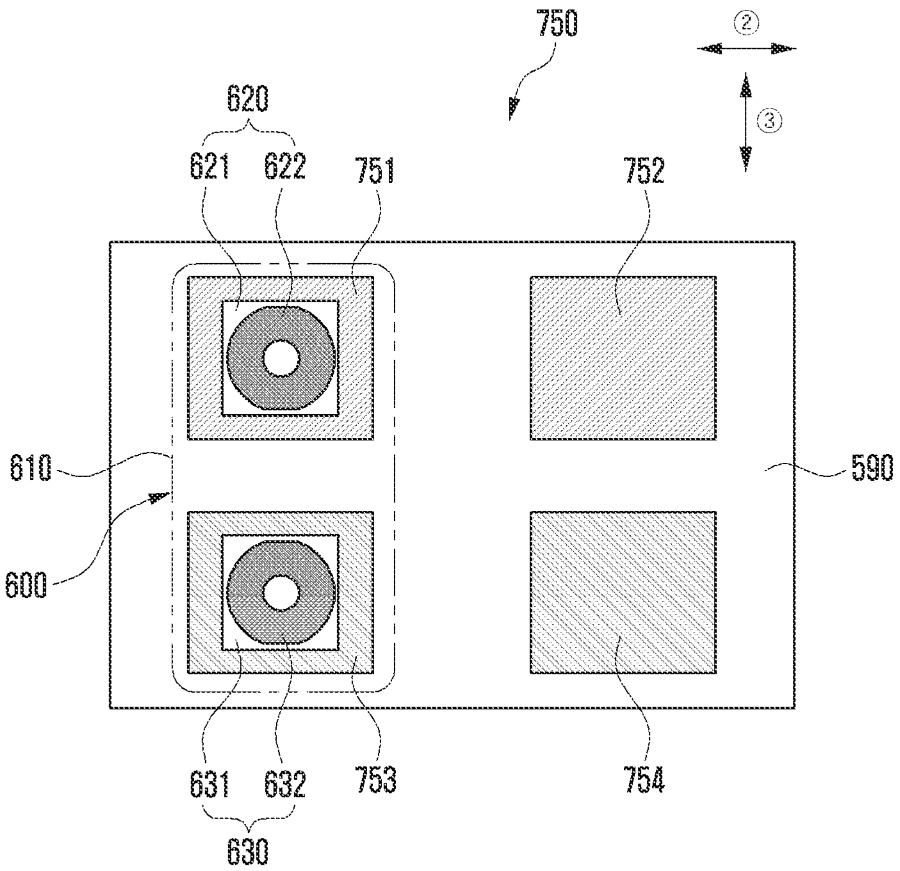

FIGS. 12A to 12C are diagrams illustrating the configuration of an antenna structure including a key button device according to various embodiments of the disclosure.

Referring to FIG. 12A, an antenna structure 700 may include the substrate 590 and also include, as a plurality of antenna elements arranged side by side at a specified interval on the substrate 590, a first conductive patch 710, a second conductive patch 720, a third conductive patch 730, and/or a fourth conductive patch 740. In an embodiment, although not shown, each of the conductive patches 710, 720, 730, and 740 may have the power feed structure of FIG. 7A (e.g., a single feed structure), the power feed structure of FIG. 7C (a dual-polarization feed structure), or the power feed structure of FIG. 7D (a dual-feed dual-polarization feed structure). For example, the antenna structure 700 may operate as an array antenna having a 1×4 structure.

According to various embodiments, the key button device 600 may be disposed at a position that overlaps at least in part with the substrate 590 when the substrate 590 is viewed from above. According to an embodiment, the key button device 600 may include the key button 610 and also include, to generate key input signals through manipulation of the key button 610, the first key module 620 having the first button substrate 621 and the first conductive contact 622 and the second key module 630 having the second button substrate 631 and the second conductive contact 632. According to an embodiment, the first key module 620 may be disposed at a position overlapping with the first conductive patch 710 when the substrate 590 is viewed from above. According to an embodiment, the second key module 630 may be disposed at a position overlapping with the fourth conductive patch 740 when the substrate 590 is viewed from above. In another embodiment, the key modules 620 and 630 may be disposed at positions overlapping with the second conductive patch 720 and/or the third conductive patch 730. In some embodiments, the key button device 600 may have two key buttons arranged to be manipulatable through the two key modules 620 and 630.

In describing the antenna structure 700 and the key button device 600 shown in FIG. 12B, the same reference numerals are assigned to substantially the same components as those of the antenna structure 700 and the key button device 600 shown in FIG. 12A, and a detailed description may be omitted.

Referring to FIG. 12B, the first key module 620 of the key button device 600 may be disposed at a position overlapping with the first conductive patch 710 when the substrate 590 is viewed from above. According to an embodiment, the second key module 630 of the key button device 600 may be disposed to overlap with a space between the third conductive patch 730 and the fourth conductive patch 740 when the substrate 590 is viewed from above. This arrangement structure may be determined depending on the size of the key button 610 of the key button device 600 and/or the arrangement positions of the pressing protrusions (e.g., the pressing protrusions 611 and 612 in FIG. 5A) formed on the key button 610.

In describing the key button device 600 shown in FIG. 12C, the same reference numerals are assigned to substantially the same components as those of the key button device 600 shown in FIG. 12A, and a detailed description may be omitted.

Referring to FIG. 12C, an antenna structure 750 may include the substrate 590 and also include, as a plurality of antenna elements disposed on the substrate 590, and a first conductive patch 751, a second conductive patch 752 disposed side by side with the first conductive patch 751 in a second direction (direction ②), a third conductive patch 753 disposed side by side with the first conductive patch 751 in a third direction (direction ③) perpendicular to the second direction (direction ②), and a fourth conductive patch 754 disposed side by side with the second conductive patch 752 in the third direction (direction ③). According to an embodiment, the fourth conductive patch 754 may be disposed side by side with the third conductive patch 753 in the second direction (direction ②). For example, the antenna structure 750 may operate as an array antenna having a 2×2 structure.

According to various embodiments, the key button device 600 may include the first key module 620 disposed at a position overlapping with the first conductive patch 751 and the second key module 630 disposed at a position overlapping with the third conductive patch 753 when the substrate 590 is viewed from above. According to an embodiment, when the substrate 590 is viewed from above, the key button 610 may be disposed at a position that overlaps at least in part with the first and third conductive patches 751 and 753. In another embodiment, the first key module 620 and/or the second key module 630 may be disposed at a position overlapping with the second conductive patch 752 and/or the third conductive patch 753 when the substrate 590 is viewed from above. In this case, the arrangement position and/or shape of the key button 610 may be changed. In some embodiments, the key button device 600 may have two key buttons arranged to be manipulatable through the two key modules 620 and 630.

Although each of the antenna structure 700 and 750 shown in FIGS. 12A to 12C include the two key modules 620 and 630, this is not construed as a limitation. For example, each of the antenna structure 700 and 750 may include one key module or three or more key modules disposed on the substrate 590.

Figure 13:
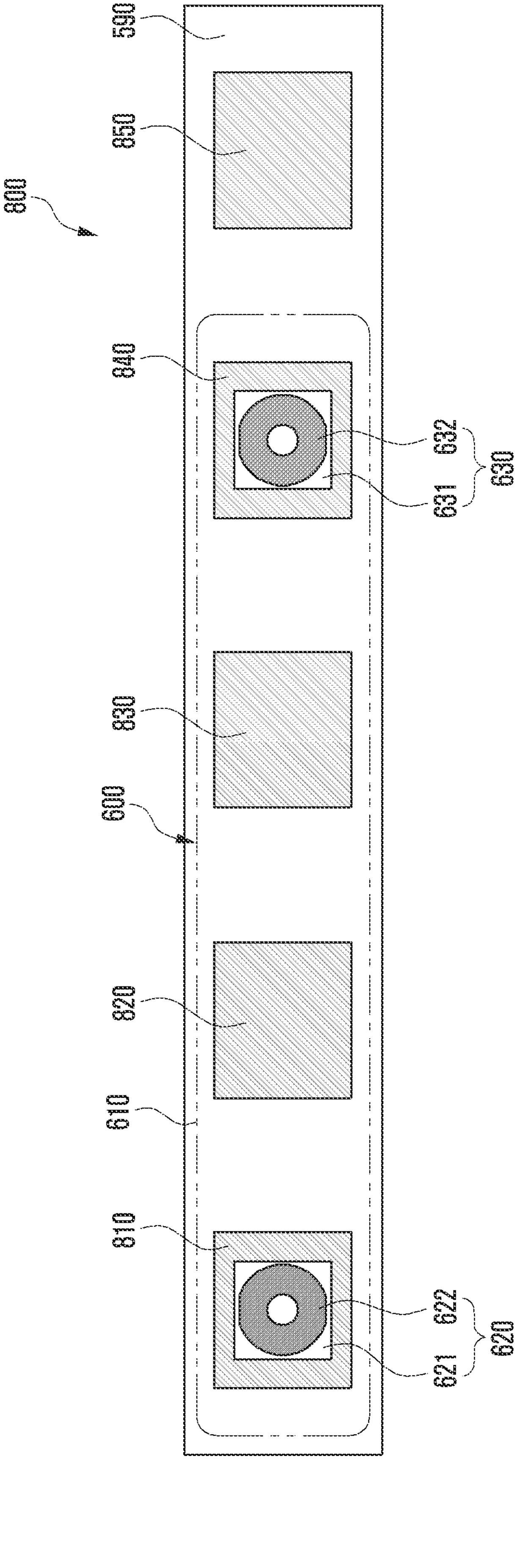
FIG. 13 is a diagram illustrating the configuration of an antenna structure including a key button device according to an embodiment of the disclosure.

FIG. 13 is a diagram illustrating the configuration of an antenna structure including a key button device according to an embodiment of the disclosure.

Referring to FIG. 13, an antenna structure 800 may include the substrate 590 and also include, as a plurality of antenna elements arranged side by side at a predetermined interval on the substrate 590, a first conductive patch 810, a second conductive patch 820, a third conductive patch 830, a fourth conductive patch 840, and/or a fifth conductive patch 850. According to an embodiment, although not shown, each of the conductive patches 810, 820, 830, 840, and 850 may have the power feed structure of FIG. 7C (a dual-polarization feed structure). In some embodiments, each of the conductive patches 810, 820, 830, 840, and 850 may be replaced with the power feed structure of FIG. 7A (a single feed structure) or the power feed structure of FIG. 7D (a dual-feed dual-polarization feeding structure). For example, the antenna structure 800 may operate as an array antenna having a 1×5 structure.

According to various embodiments, the key button device 600 may be disposed at a position that overlaps at least in part with the substrate 590 when the substrate 590 is viewed from above. According to an embodiment, the key button device 600 may include the key button 610 and also include, to generate key input signals through manipulation of the key button 610, the first key module 620 having the first button substrate 621 and the first conductive contact 622 and the second key module 630 having the second button substrate 631 and the second conductive contact 632. According to an embodiment, the first key module 620 may be disposed at a position overlapping with the first conductive patch 810 when the substrate 590 is viewed from above. According to an embodiment, the second key module 630 may be disposed at a position overlapping with the fourth conductive patch 840 when the substrate 590 is viewed from above. In some embodiments, the key modules 620 and 630 may be symmetrically disposed with respect to the third conductive patch 830. For example, based on the third conductive patch 830, the first key module 620 may be disposed on the second conductive patch 820, and the second key module 630 may be disposed on the fourth conductive patch 840. In another example, based on the third conductive patch 830, the first key module 620 may be disposed on the first conductive patch 810, and the second key module 630 may be disposed on the fifth conductive patch 850. In some embodiments, the key modules 620 and 630 may be asymmetrically disposed on any two conductive patches of the conductive patches 810, 820, 830, 840, and 850. In some embodiments, the key button device 600 may have two key buttons arranged to be manipulatable through the two key modules 620 and 630.

Figure 14:
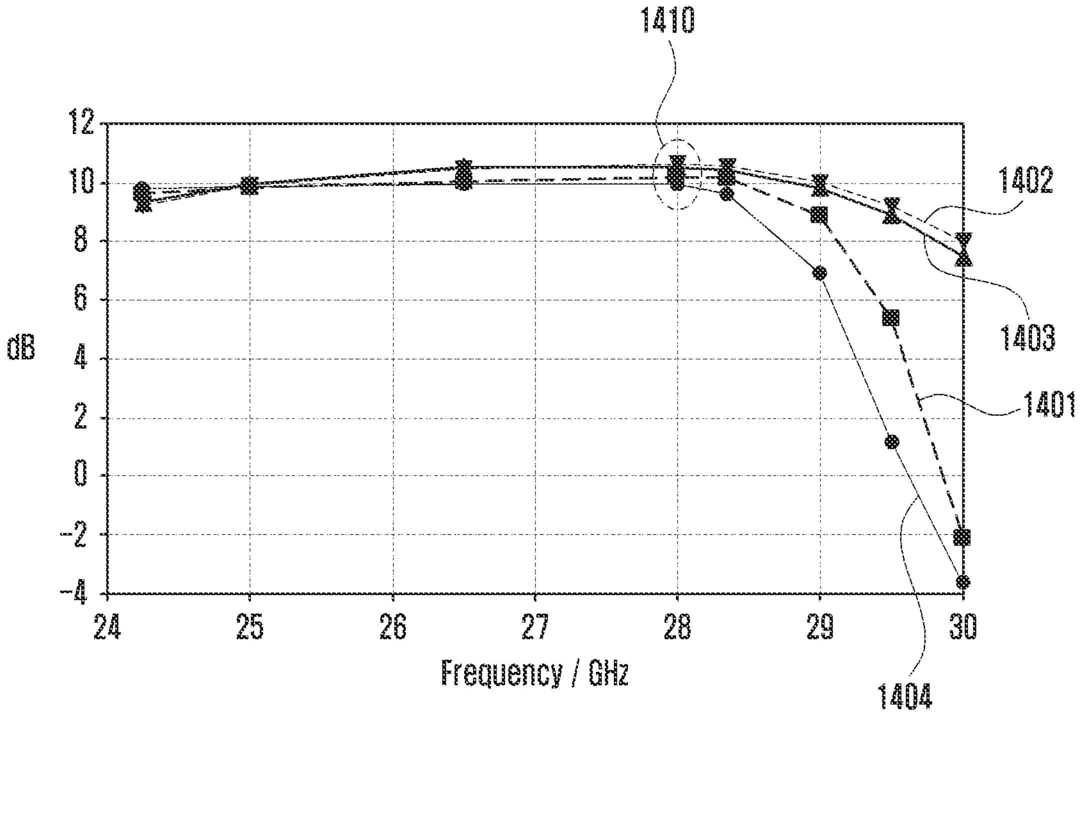
FIG. 14 is a graph illustrating the radiation performance of an antenna structure depending on the presence or absence of a key button device in the configuration of FIG. 13 according to an embodiment of the disclosure.

FIG. 14 is a graph illustrating the radiation performance of an antenna structure depending on the presence or absence of a key button device in the configuration of FIG. 13 according to an embodiment of the disclosure.

Referring to FIG. 14, it can be seen that, in the antenna structure 800 of FIG. 13 supporting dual polarization and including the conductive patches (e.g., the conductive patches 810, 820, 830, 840, and 850 in FIG. 13) with a 1×5 array structure, the gains of vertical polarization (graph 1401) and horizontal polarization (graph 1402) when the key modules (e.g., the key modules 620 and 630 in FIG. 13) of the key button device (e.g., the key button device 600 in FIG. 13) are disposed to overlap with some conductive patches 810 and 840 among the conductive patches 810, 820, 830, 840, and 850 do not change significantly enough to affect the radiation performance in an operating frequency band 1410 (e.g., about 28 GHz) compared to the gains of vertical polarization (graph 1403) and horizontal polarization (graph 1404) when the key button device 600 is not disposed. This means that, even if the conductive patches 810, 820, 830, 840, and 850 have an array arrangement structure and the key modules 620 and 630 are disposed to overlap with some conductive patches 810 and 840 among the conductive patches 810, 820, 830, 840, and 850, the radiation performance of the antenna structure 800 is not substantially deteriorated.

Figure 15:
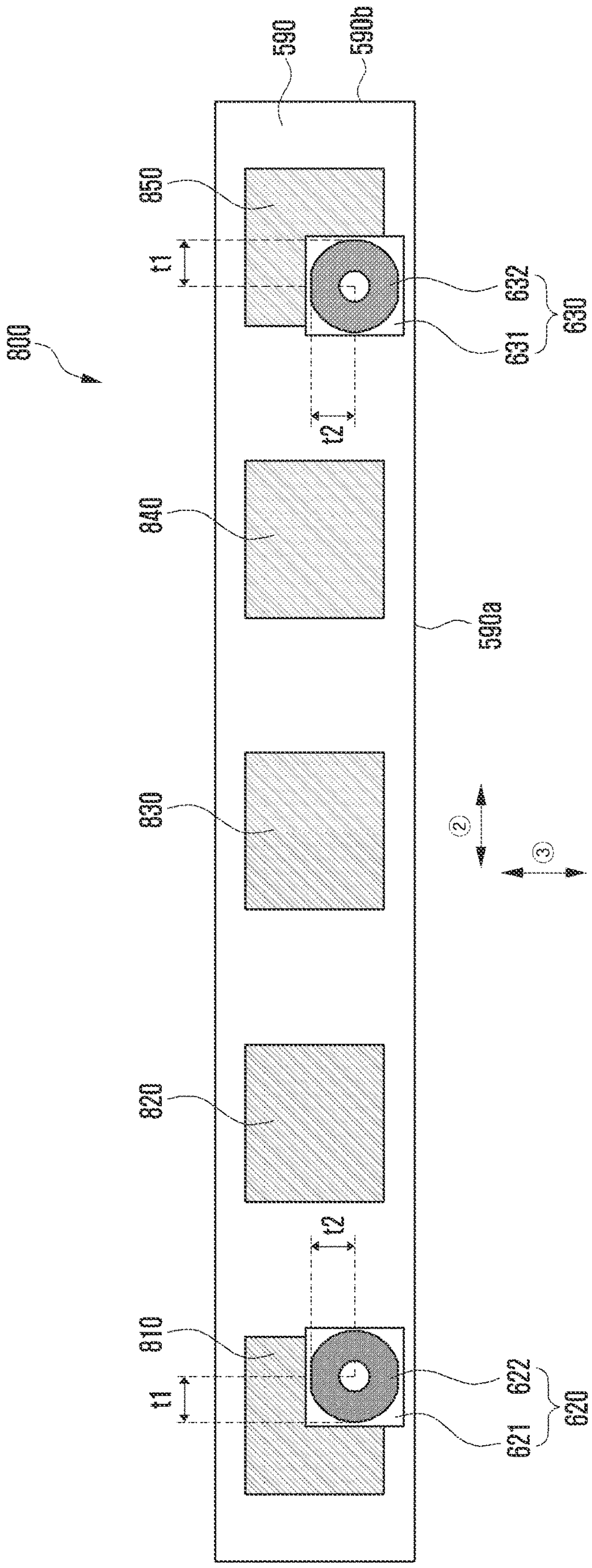
FIG. 15 is a diagram illustrating the configuration of an antenna structure including key modules according to an embodiment of the disclosure.

FIG. 15 is a diagram illustrating the configuration of an antenna structure including key modules according to an embodiment of the disclosure.

In describing the antenna structure 800 shown in FIG. 15, the same reference numerals are assigned to substantially the same components as those of the antenna structure 800 shown in FIG. 13, and a detailed description may be omitted.

Referring to FIG. 15, the first key module 620 may be disposed at a position overlapping at least in part with the first conductive patch 810 when the substrate 590 is viewed from above. According to an embodiment, while such a partial overlap with the first conductive patch 810 is maintained, the center of the first key module 620 may be shifted from the center of the first conductive patch 810 rightwards by a first distance t1 along a second direction (direction ②) parallel to a long side 590*a* of the substrate 590 and downwards by a second distance t2 along a third direction (direction ③) parallel to a short side 590*b* of the substrate 590. According to an embodiment, while a partial overlap with the fifth conductive patch 850 is maintained, the center of the second key module 630 may be shifted from the center of the fifth conductive patch 850 leftwards by the first distance t1 along the second direction (direction ②) parallel to the long side 590*a* of the substrate 590 and downwards by the second distance t2 along the third direction (direction ③) parallel to the short side 590*b* of the substrate 590. In this case, each of the first and second key modules 620 and 630 may be changed in shape to have the conductive pad 6251 as shown in FIG. 11, and the first conductive via (e.g., the first conductive via 623 in FIG. 11) of the substrate 590 may be formed to be electrically connected at a position close to the center of the conductive patch 810 or 850.

Figure 16A:
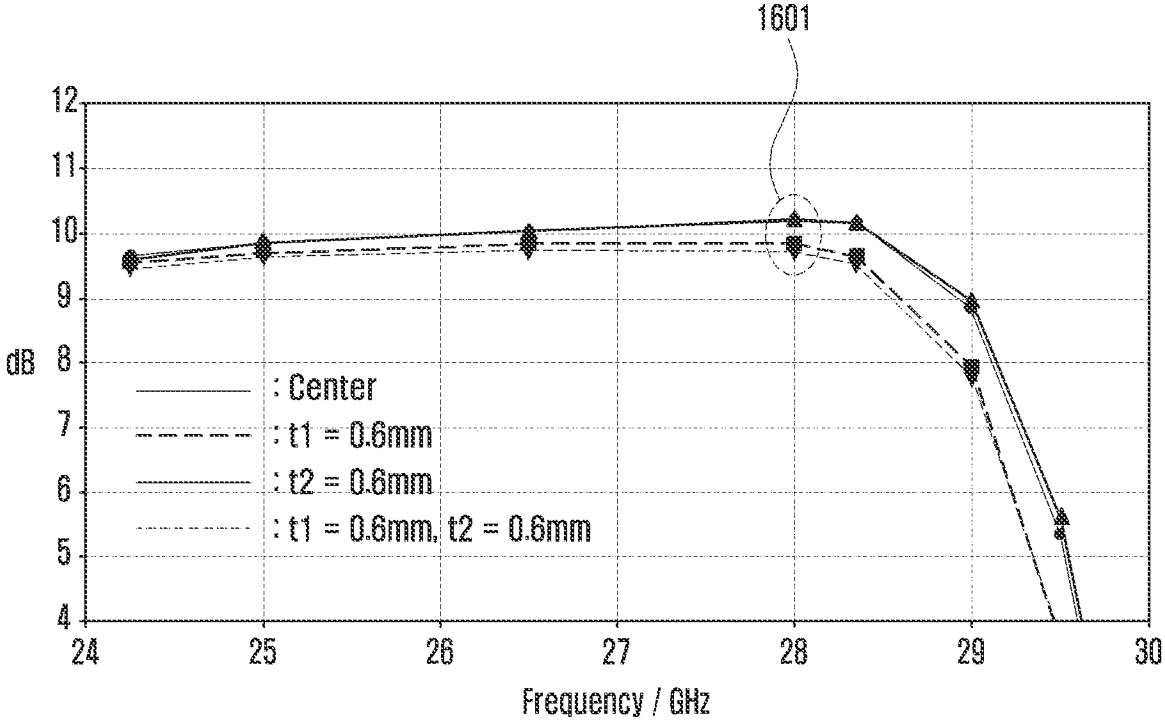
FIGS. 16A and 16B are graphs illustrating the radiation performance of an antenna structure depending on the movement arrangement of key modules in the configuration of FIG. 15 according to various embodiments of the disclosure.
Figure 16B:
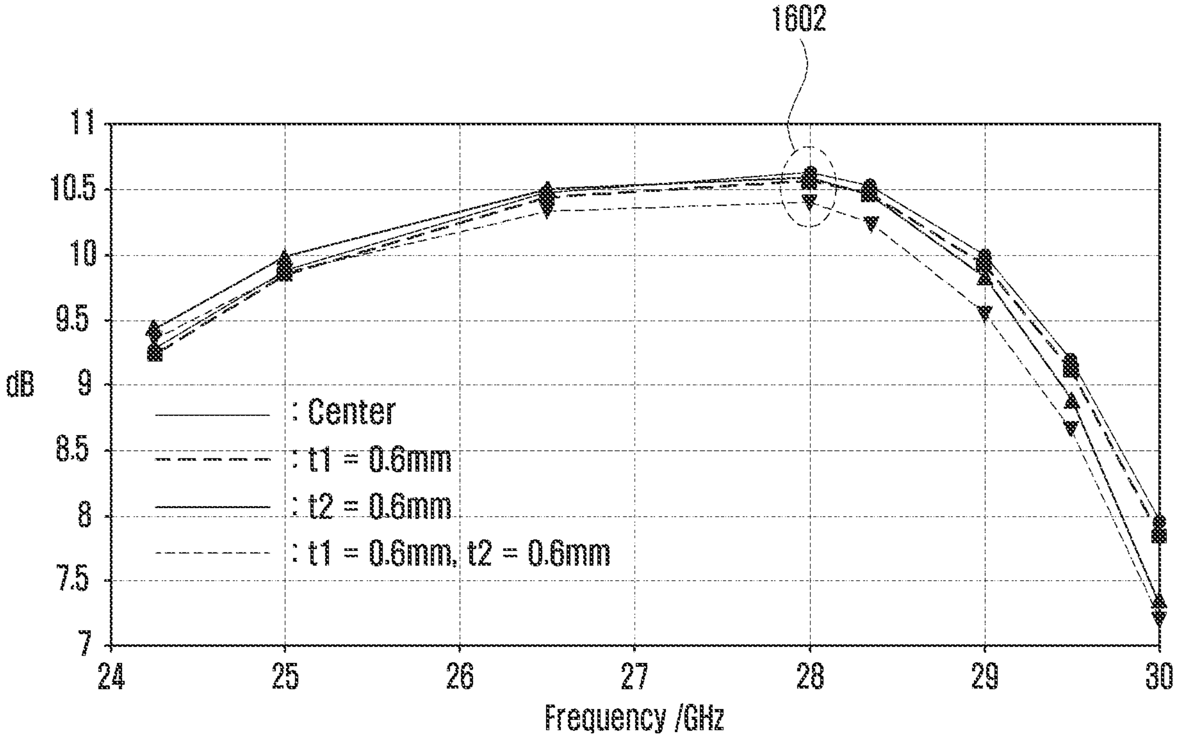

FIGS. 16A and 16B are graphs illustrating the radiation performance of an antenna structure depending on the movement arrangement of key modules in the configuration of FIG. 15 according to various embodiments of the disclosure.

Referring to FIGS. 16A and 16B, graphs show the gains of horizontal polarization and vertical polarization of the antenna structure 800 when each of the first and second key modules 620 and 630 is disposed at the center of each of the first and fifth conductive patches 810 and 850, when shifted from the center by the first shift distance t1 (e.g., about 6 mm) along the second direction (direction ②) parallel to the long side 590*a* of the substrate 590, when shifted from the center by the second shift distance t2 (e.g., about 6 mm) along the third direction (③ direction) parallel to the short side 590*b* of the substrate 590, or when shifted by both the first shift distance t1 and the second shift distance t2, in the configuration of FIG. 15, when the substrate 590 is viewed from above. It can be seen that the gain change is not large enough to affect the radiation performance in an operating frequency band 1601 or 1602 (e.g., about 28 GHz). This means that, even if the key modules 620 and 630 are eccentrically disposed while overlapping at least in part with the conductive patches 810 and 850, the radiation performance of the antenna structure 800 is not substantially deteriorated.

Figure 17:
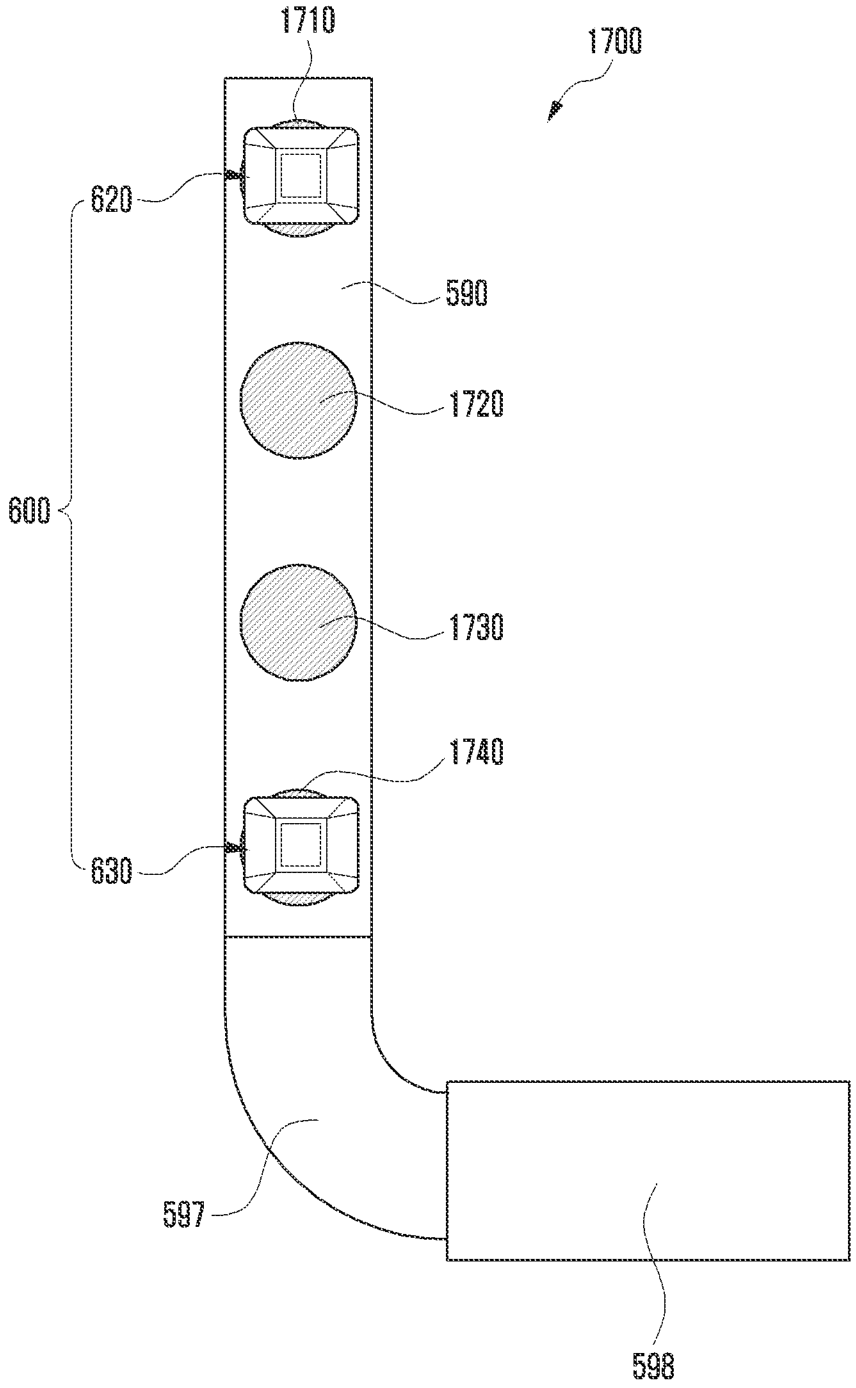
FIG. 17 is a diagram illustrating the configuration of an antenna structure including key modules according to an embodiment of the disclosure.

FIG. 17 is a diagram illustrating the configuration of an antenna structure including key modules according to an embodiment of the disclosure.

Referring to FIG. 17, an electronic device (e.g., the electronic device 300 in FIG. 5A) may include an antenna structure 1700 including the substrate 590 and a plurality of conductive patches 1710, 1720, 1730, and 1740 disposed on the substrate 590, and the key button device 600 including the first key module 620 and/or the second key module 630 disposed to overlap with some conductive patches 1710 and 1740 among the conductive patches 1710, 1720, 1730, and 1740 when the substrate 590 is viewed from above. According to an embodiment, the antenna structure 1700 may include an electrical connection member 597 which extends from the substrate 590 and on which a wireless communication circuit 598 (e.g., the wireless communication circuit 595 in FIG. 6A) (e.g., RFIC) is disposed. According to an embodiment, the electrical connection member 597 may include a flexible printed circuit board (FPCB) type RF cable (FRC) or a coaxial cable.

According to various embodiments, the electrical connection member 597 may be electrically connected to the main board (e.g., the printed circuit board 340 in FIG. 3C) of the electronic device (e.g., the electronic device 300 in FIG. 5A) through a connector (not shown). Accordingly, the antenna structure 1700 may be electrically connected to the main board (e.g., the printed circuit board 340 in FIG. 3C) through the electrical connection member 597. In some embodiments, the wireless communication circuit 598 may be disposed on the main board (e.g., the printed circuit board 340 in FIG. 3C). According to an embodiment, the key button device 600 may be disposed on the substrate 590 and electrically connected to the electrical connection member 597 through an electrical connection structure including a conductive via (e.g., the first conductive via 623 in FIG. 6A) connected to the key modules 620 and 630.

Figure 18A:
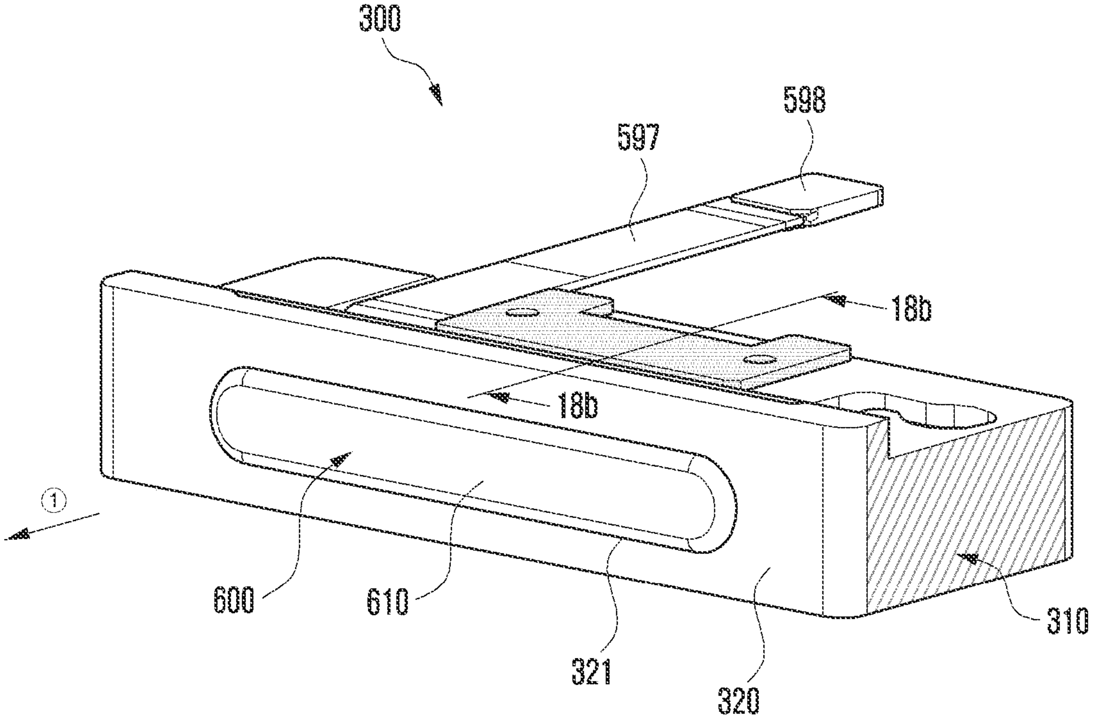
FIG. 18A is a partially cutaway perspective view illustrating an electronic device in which a key button device is disposed in a housing according to an embodiment of the disclosure.

FIG. 18A is a partially cutaway perspective view illustrating an electronic device in which a key button device is disposed in a housing according to an embodiment of the disclosure.

Figure 18B:
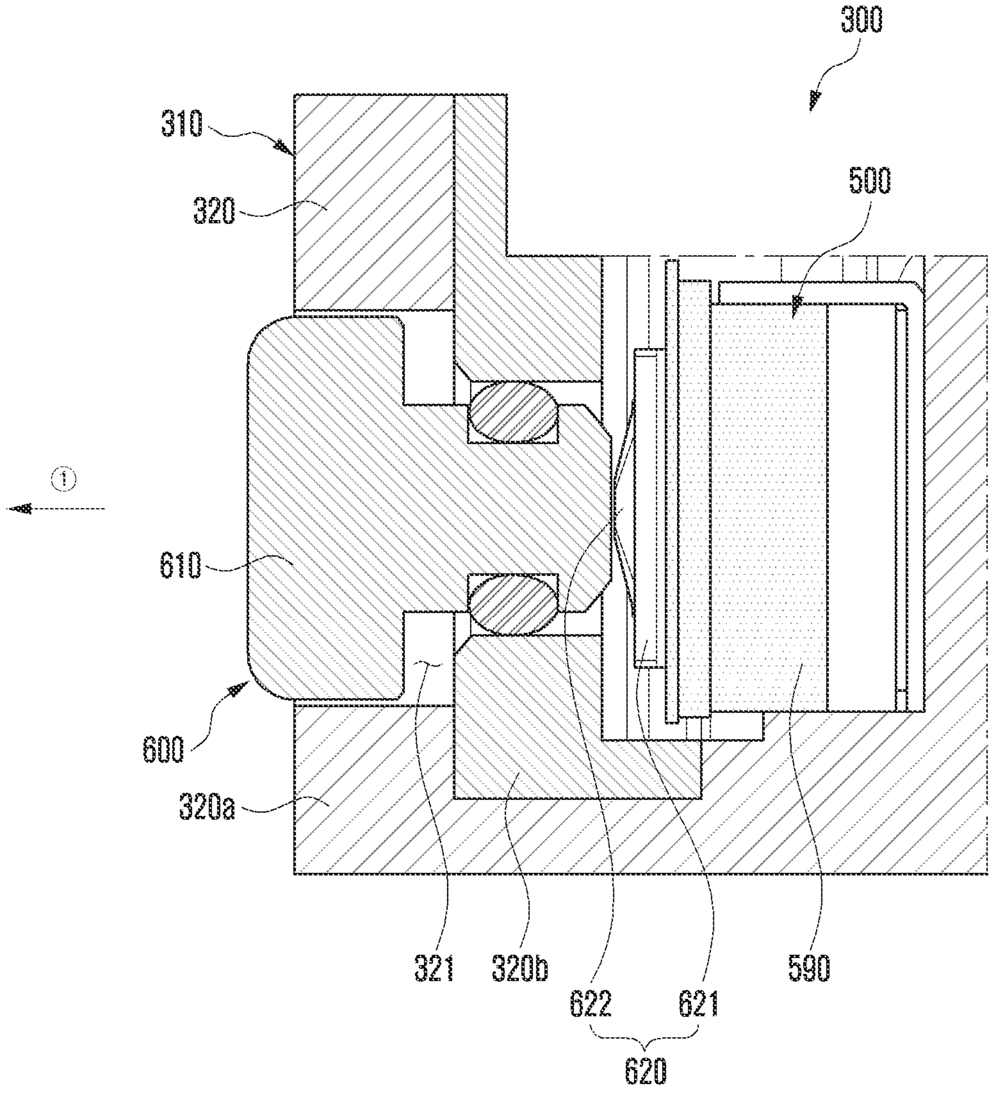
FIG. 18B is a cross-sectional view partially illustrating the electronic device taken along line 18*b*-18*b* of FIG. 18A according to an embodiment of the disclosure.

FIG. 18B is a cross-sectional view partially illustrating the electronic device taken along line 18*b*-18*b* of FIG. 18A according to an embodiment of the disclosure.

Referring to FIGS. 18A and 18B, the electronic device 300 may include the housing 310 including the side member 320, the antenna structure 500 disposed in the inner space of the housing 310 to form a beam pattern in a first direction (direction ①) toward which the side member 320 faces, and the key button device 600 that faces at least in part the antenna structure 500 and is disposed to be at least partially visible from the outside and be manipulatable through the side member 320. According to an embodiment, when the side member 320 is viewed from the outside, at least a portion of the key button device 600 may be disposed to overlap with the antenna structure 500.

According to various embodiments, the key button device 600 may include the key button 610 at least partially protruded or exposed to the outside through the opening 321 formed in the side member 320, and the first key module 620 or the second key module 630 disposed between the key button 610 and the substrate 590 of the antenna structure 500. According to an embodiment, the first key module 620 may include the first button substrate 621 disposed on the substrate 590 and the first conductive contact 622 disposed on the first button substrate 621. The second key module 630 may include the second button substrate 631 and the second conductive contact 632.

According to various embodiments, the side member 320 may include a conductive material 320*a* of the electronic device 300. According to an embodiment, the side member 320 may include a non-conductive material 320*b* insert-injected into the conductive material 320*a*. According to an embodiment, the opening 321 may be formed in the conductive material 320*a*. In this case, the antenna structure 500 may be disposed such that a beam pattern is formed through the opening 321 in the first direction (direction ①) toward which the key button 610 disposed to overlap with the substrate 590 faces. To allow smooth formation of the beam pattern, the key button 610 may be formed of a non-conductive material (e.g., injection material).

FIGS. 19A to 19E are diagrams illustrating the configuration of a key button or a housing for radiation of an antenna structure according to various embodiments of the disclosure.

Figure 19A:
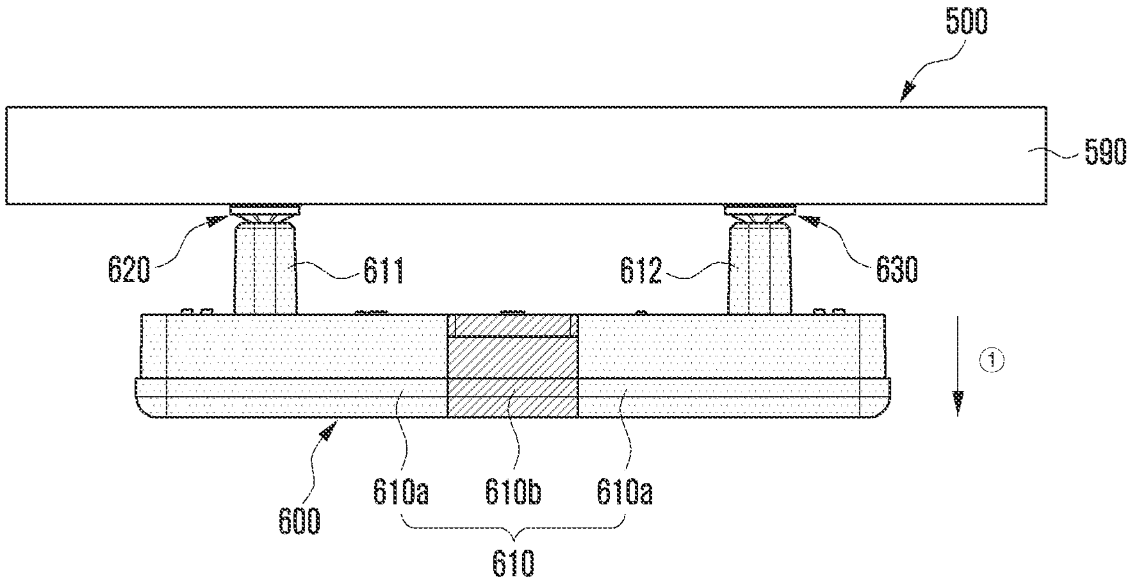
FIGS. 19A, 19B, 19C, 19D, and 19E are diagrams illustrating the configuration of a key button or a housing for radiation of an antenna structure according to various embodiments of the disclosure.

Referring to FIG. 19A, the key button device 600 may include the key button 610 including a pair of pressing protrusions 611 and 612, and the key modules 620 and 630 disposed respectively at positions corresponding to the pair of pressing protrusions 611 and 612. According to an embodiment, the key modules 620 and 630 may be disposed on the substrate 590 of the antenna structure 500 as described above.

According to various embodiments, the antenna structure 500 may be disposed such that a beam pattern is formed in the first direction (direction ①) toward which the key button 610 faces. In this case, the key button 610 disposed to overlap at least in part with the direction of the beam pattern may have the conductive material 610*a* (e.g., metal) and/or the non-conductive material 610*b* (e.g., polymer). For example, the key button 610 may be formed of at least partially segmented conductive material 610*a* through insert injection of the non-conductive material 610*b*. According to an embodiment, in the key button 610, the non-conductive material 610*b* may be disposed between (e.g., in a middle of) the pair of pressing protrusions 611 and 612.

Figure 19B:
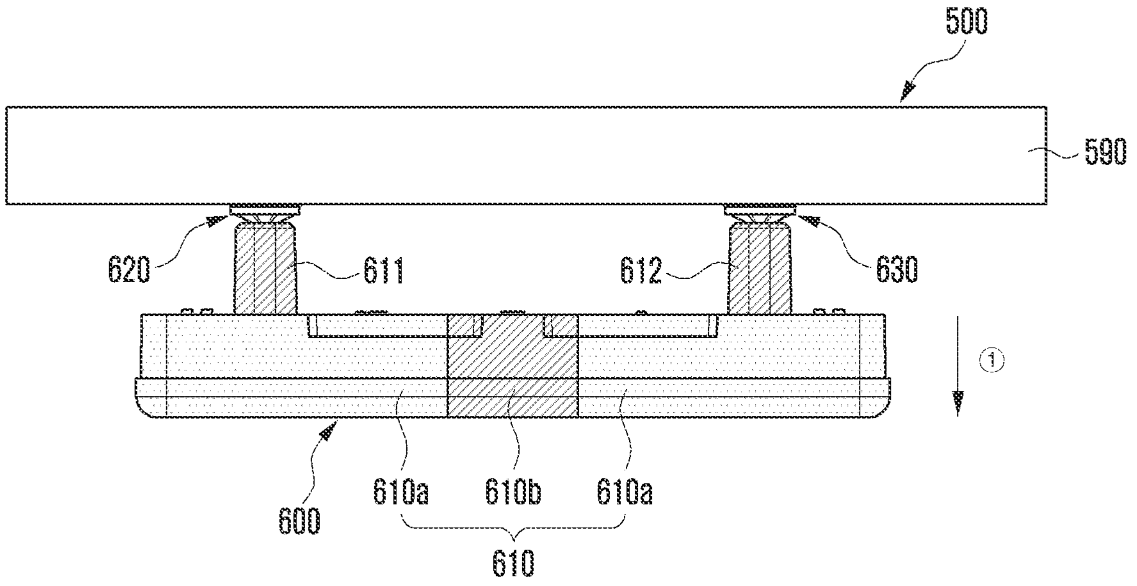

Referring to FIG. 19B, because the key button 610 includes the pressing protrusions 611 and 612 formed of the non-conductive material 610*b* in the configuration of FIG. 19A, it can reduce interference when the antenna structure 500 forms a beam pattern.

Figure 19C:
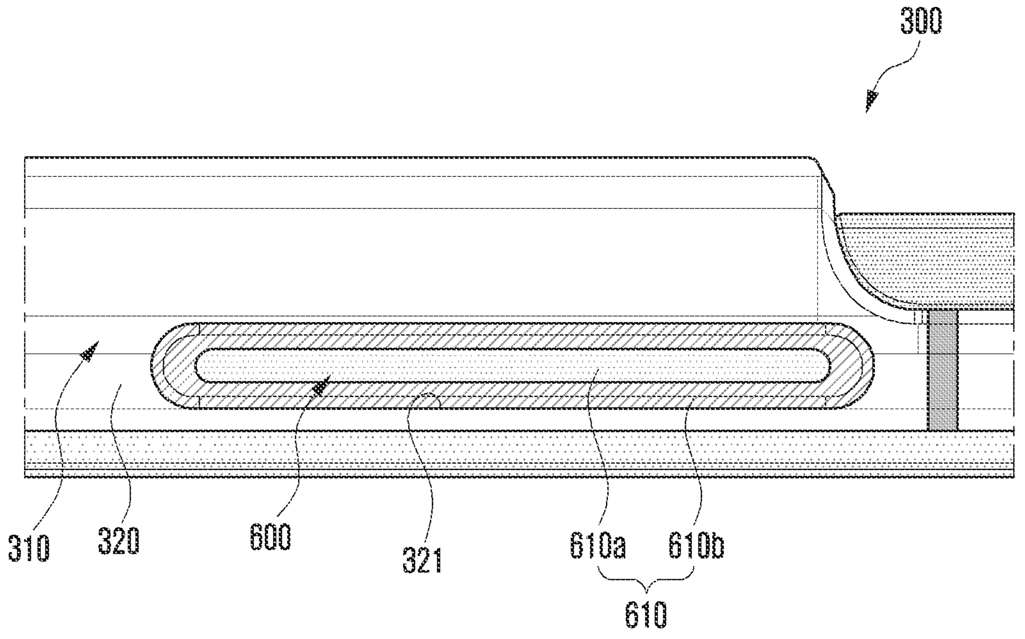

Referring to FIG. 19C, the key button 610 may be exposed or protruded from the opening 321 of the side member 320 to be visible from the outside. According to an embodiment, in the exposed portion when the side member 320 is viewed from the outside, the key button may be formed of the conductive material 610*a* disposed centrally and the non-conductive material 610*b* surrounding at least a portion of the edge of the conductive material 610*a*. For example, the non-conductive material 610*b* may be disposed in a closed loop shape along the edge of the conductive material 610*a* or alternatively in an open loop shape in which the conductive material 610*a* is at least partially interposed.

Figure 19D:
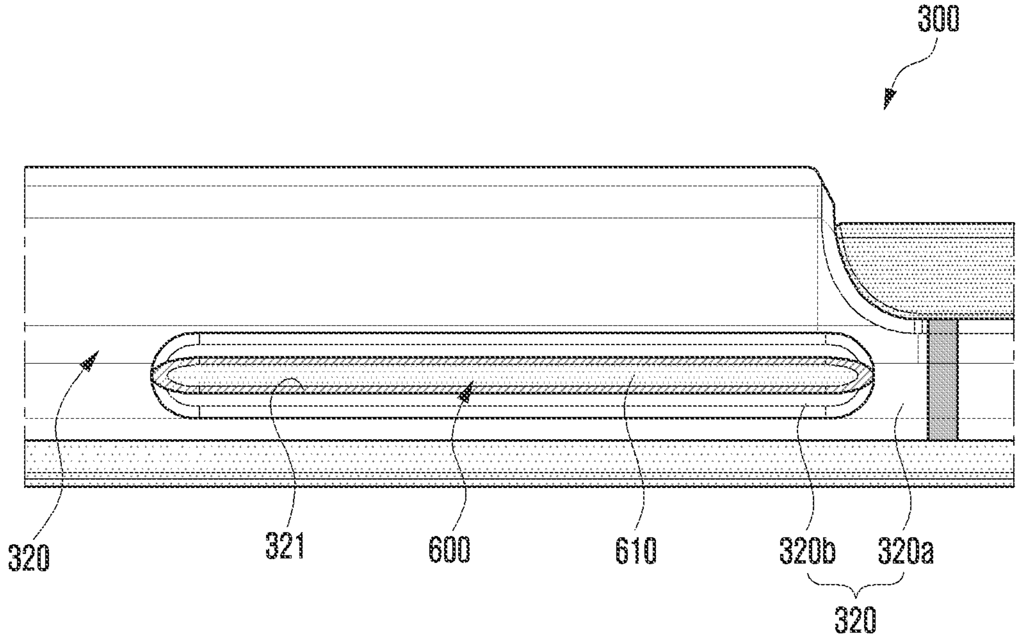

Referring to FIG. 19D, the opening 321 may have the conductive material 320*a* or the non-conductive material 320*b* of the side member 320. In this case, the non-conductive material 320*b* may be exposed to the outside through the opening 321 or disposed at a position facing the key button 610 protruded. For example, the non-conductive material 320*b* may form the entire inner rim of the opening 321 or may form a partial inner rim of the opening 321 through the intervention of the conductive material 320*a*.

Figure 19E:
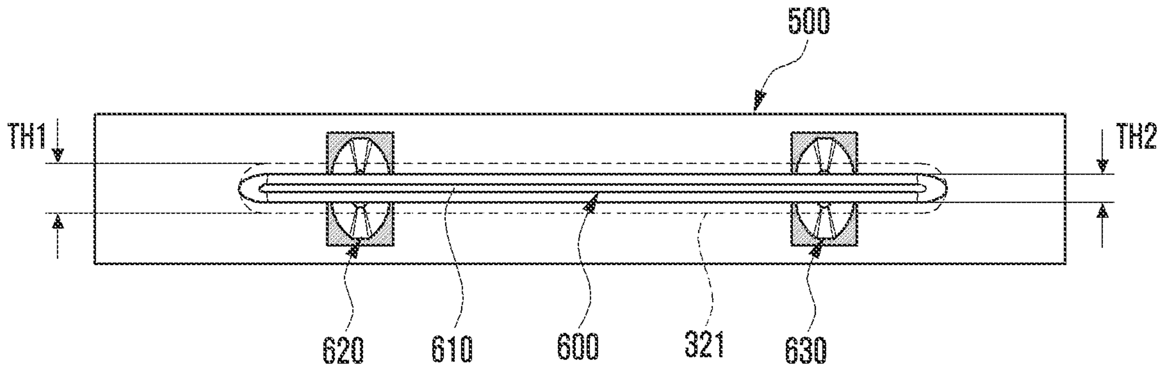

Referring to FIG. 19E, when the opening 321 is viewed from the outside, the key button 610 of the key button device 600 may be disposed to overlap at least in part with the first and second key modules 620 and 630 disposed on the antenna structure 500. According to an embodiment, the key button 610 may be formed of a conductive material. In this case, the key button 610 may be formed to have a second width TH2 smaller than a first width TH1 of the opening 321. Accordingly, the beam pattern formed by the antenna structure 500 may be transmitted to the outside through a space between the opening 321 and the key button 610.

In some embodiments, when the first width TH1 and the second width TH2 are formed to be substantially the same, the beam pattern of the antenna structure 500 may be transmitted to the outside through a non-conductive portion formed in the side member (e.g., the side member 320 in FIG. 19D) near the key button 610.

According to various embodiments, an electronic device (e.g., the electronic device 300 in FIG. 5A) may include a housing (e.g., the housing 310 in FIG. 5A); an antenna structure (e.g., the antenna structure 500 in FIG. 5A) disposed in an inner space of the housing and including a substrate (e.g., the substrate 590 in FIG. 6A) having a first substrate surface (e.g., the first substrate surface 5901 in FIG. 5A) facing toward a first direction (e.g., the first direction (direction ①) in FIG. 5A), a second substrate surface (e.g., the second substrate surface 5902 in FIG. 5A) facing toward a direction opposite to the first substrate surface, and a ground layer (e.g., the ground layer 592 in FIG. 6A) disposed in a space between the first substrate surface and the second substrate surface, at least one conductive patch (e.g., the conductive patch 510 in FIG. 6A) disposed between the ground layer and the first substrate surface or to be exposed to the first substrate surface, at least one power feeder (e.g., the power feeder 511 in FIG. 6A) disposed at a position of the at least one conductive patch, and at least one electrical connection structure disposed at the substrate including: a first conductive via (e.g., the first conductive via 623 in FIG. 6A) disposed to pass through the at least one conductive patch and the ground layer, and a second conductive via (e.g., the second conductive via 624 in FIG. 6A) passing through the at least one conductive patch and electrically connected to the ground layer; an electronic component (e.g., the key button device 600 in FIG. 6A) disposed on the first substrate surface and disposed to overlap at least in part with the at least one conductive patch when the first substrate surface is viewed from above, the electronic component being electrically connected to a main board (e.g., the printed circuit board 340 in FIG. 3C) through the at least one electrical connection structure; and a wireless communication circuit (e.g., the wireless communication circuit 595 in FIG. 6A) disposed in the inner space, electrically connected to the at least one power feeder, and configured to form a beam pattern in the first direction through the at least one conductive patch According to various embodiments, the at least one power feeder may include: a first power feeder disposed on a first line passing through a center of the at least one conductive patch, and a second power feeder disposed on a second line passing through the center and perpendicular to the first line.

According to various embodiments, when the at least one conductive patch is viewed from above, the first conductive via and the second conductive via may be symmetrically disposed with respect to the center.

According to various embodiments, the first conductive via and the second conductive via may be disposed within a distance of 30% of a linear distance from the center to an end of the at least one conductive patch.

According to various embodiments, when the at least one conductive patch is viewed from above, the second conductive via may be disposed at a position overlapping with the center.

According to various embodiments, the first conductive via may be disposed within a distance of 30% of a linear distance from the center to an end of the at least one conductive patch.

According to various embodiments, the electronic device may further include a connector disposed on the second substrate surface of the substrate and electrically connected to the first conductive via, and the connector may be electrically connected to the main board.

According to various embodiments, the electronic device may further include a surface mount device (SMD) pad disposed between the electronic component and the first substrate surface, and the SMD pad may include a first conductive pad electrically connected to the first conductive via exposed on the first substrate surface.

According to various embodiments, the first conductive pad may be formed to have an elongated shape outward from the center when the first substrate surface is viewed from above, the electronic component may be electrically connected at a first point of the first conductive pad, and the first conductive via may be electrically connected at a second point of the first conductive pad closer to the center than the first point.

According to various embodiments, the SMD pad may include a second conductive pad electrically connected to the second conductive via exposed on the first substrate surface, the second conductive pad may be formed to have an elongated shape outward from the center when the first substrate surface is viewed from above, the electronic component may be electrically connected at a first point of the second conductive pad, and the second conductive via may be electrically connected at a second point of the second conductive pad closer to the center than the first point.

According to various embodiments, radiation performance of the antenna structure may be determined through a separation distance from the center to the second conductive via when the first substrate surface is viewed from above.

According to various embodiments, the electronic component may include a key button device having at least one key button exposed at least in part to the outside through an opening formed in a conductive portion disposed at least partially in the housing.

According to various embodiments, a non-conductive portion may be formed along an edge of the opening.

According to various embodiments, when the first substrate surface is viewed from above, the at least one key button may be disposed to overlap at least in part with the at least one conductive patch.

According to various embodiments, the at least one key button may be formed of a non-conductive material.

According to various embodiments, the at least one key button may have at least two conductive portions segmented through at least one non-conductive portion.

According to various embodiments, the at least one conductive patch may include a plurality of conductive patches disposed at predetermined intervals.

According to various embodiments, the key button device may include key modules disposed respectively to overlap with two or more of the plurality of conductive patches, and the at least one electrical connection structure may be disposed on each of the key modules.

According to various embodiments, the key modules may be symmetrically disposed in the plurality of conductive patches.

According to various embodiments, the at least one key button may include one key button accommodating the key modules together or two or more key buttons individually accommodating at least two key modules among the key modules.

According to various embodiments, the antenna structure may further include at least one additional conductive patch disposed between the ground layer and the first substrate surface or to be exposed to the first substrate surface, and at least one additional power feeder disposed at a position of the at least one additional conductive patch. The wireless communication circuit may be electrically connected to the at least one additional power feeder, and may be configured to form the beam pattern in the first direction additionally through the at least one additional conductive patch. The electronic component may not be disposed to overlap at least in part with the at least one additional conductive patch when the first substrate surface is viewed from above.

According to various embodiments, the at least one conductive patch and the at least one additional conductive patch may be disposed at predetermined intervals.

According to various embodiments, the antenna structure may further include at least one conductive dummy patch disposed between the ground layer and the first substrate surface or to be exposed to the first substrate surface. The at least one conductive dummy patch may be spaced apart from the at least one conductive patch so as to be capacitively coupled to the at least one conductive patch. The at least one conductive dummy patch may not be electrically connected to the wireless communication circuit.

According to various embodiments, the electronic component may not be disposed to overlap at least in part with the at least one conductive dummy patch when the first substrate surface is viewed from above.

While the disclosure has been shown and described with reference with various embodiments thereof, it will be understood by those skilled in the art that various changes in form and details may be made therein without departing from the spirit and scope of the disclosure as defined by the appended claims and their equivalents.

The invention claimed is:

1. An electronic device comprising:

a housing;

an antenna structure disposed in an inner space of the housing and including:

a substrate having a first substrate surface facing toward a first direction, a second substrate surface facing toward a direction opposite to the first substrate surface, and a ground layer disposed in a space between the first substrate surface and the second substrate surface, at least one conductive patch disposed between the ground layer and the first substrate surface or to be exposed to the first substrate surface, and at least one power feeder disposed at a position of the at least one conductive patch;

an electronic component disposed on the first substrate surface and disposed to overlap at least in part with the at least one conductive patch when the first substrate surface is viewed from above, the electronic component being electrically connected to a main board through at least one electrical connection structure; and a wireless communication circuit disposed in the inner space, electrically connected to the at least one power feeder, and configured to form a beam pattern in the first direction through the at least one conductive patch, wherein the at least one electrical connection structure including:

a first conductive via disposed to pass through the at least one conductive patch and the ground layer, and a second conductive via passing through the at least one conductive patch and electrically connected to the ground layer.

2. The electronic device of claim 1, wherein the at least one power feeder includes:

a first power feeder disposed on a first line passing through a center of the at least one conductive patch, and a second power feeder disposed on a second line passing through the center and perpendicular to the first line.

3. The electronic device of claim 1, wherein when the at least one conductive patch is viewed from above, the first conductive via and the second conductive via are symmetrically disposed with respect to a center of the at least one conductive patch.

4. The electronic device of claim 2, wherein the first conductive via and the second conductive via are disposed within a distance of 30% of a linear distance from the center to an end of the at least one conductive patch.

5. The electronic device of claim 1, wherein when the at least one conductive patch is viewed from above, the second conductive via is disposed at a position overlapping with a center of the at least one conductive patch.

6. The electronic device of claim 5, wherein the first conductive via is disposed within a distance of 30% of a linear distance from the center to an end of the at least one conductive patch.

7. The electronic device of claim 1, further comprising:

a connector disposed on the second substrate surface of the substrate and electrically connected to the first conductive via, wherein the connector is electrically connected to the main board.

8. The electronic device of claim 1, further comprising:

a surface mount device (SMD) pad disposed between the electronic component and the first substrate surface, wherein the SMD pad includes a first conductive pad electrically connected to the first conductive via exposed on the first substrate surface.

9. The electronic device of claim 8, wherein the first conductive pad is formed to have an elongated shape outward from a center of the at least one conductive patch when the first substrate surface is viewed from above, wherein the electronic component is electrically connected at a first point of the first conductive pad, and wherein the first conductive via is electrically connected at a second point of the first conductive pad closer to the center than the first point.

10. The electronic device of claim 8, wherein the SMD pad includes a second conductive pad electrically connected to the second conductive via exposed on the first substrate surface, wherein the second conductive pad is formed to have an elongated shape outward from a center of the at least one conductive patch when the first substrate surface is viewed from above, wherein the electronic component is electrically connected at a first point of the second conductive pad, and wherein the second conductive via is electrically connected at a second point of the second conductive pad closer to the center than the first point.

11. The electronic device of claim 1, wherein radiation performance of the antenna structure is determined through a separation distance from a center of the at least one conductive patch to the second conductive via when the first substrate surface is viewed from above.

12. The electronic device of claim 1, wherein the electronic component includes a key button device having at least one key button exposed at least in part to the outside through an opening formed in a conductive portion disposed at least partially in the housing.

13. The electronic device of claim 12, wherein a non-conductive portion is formed along an edge of the opening.

14. The electronic device of claim 12, wherein when the first substrate surface is viewed from above, the at least one key button is disposed to overlap at least in part with the at least one conductive patch.

15. The electronic device of claim 12, wherein the at least one key button is formed of a non-conductive material.

16. The electronic device of claim 12, wherein the at least one key button has at least two conductive portions segmented through at least one non-conductive portion.

17. The electronic device of claim 12, wherein the at least one conductive patch includes a plurality of conductive patches disposed at predetermined intervals.

18. The electronic device of claim 17, wherein the key button device includes key modules disposed respectively to overlap with two or more of the plurality of conductive patches, and wherein the at least one electrical connection structure is disposed on each of the key modules.

19. The electronic device of claim 18, wherein the key modules are symmetrically disposed in the plurality of conductive patches.

20. The electronic device of claim 18, wherein the at least one key button includes one key button accommodating the key modules together or two or more key buttons individually accommodating at least two key modules among the key modules.

* * * * *